US009927559B2

(12) United States Patent
Li et al.

(10) Patent No.: US 9,927,559 B2
(45) Date of Patent: Mar. 27, 2018

(54) WAVELENGTH-CONTROLLED DIRECTIVITY OF ALL-DIELECTRIC OPTICAL NANO-ANTENNAS

(71) Applicants: IMEC VZW, Leuven (BE); Katholieke Universiteit Leuven, KU LEUVEN R&D, Leuven (BE)

(72) Inventors: Jiaqi Li, Leuven (BE); Niels Verellen, Leuven (BE); Pol Van Dorpe, Spalbeek (BE); Dries Vercruysse, Sint-Andries (BE)

(73) Assignees: IMEC VZW, Leuven (BE); Katholieke Universiteit Leuven, KU LEUVEN R&D, Leuven (BE)

( * ) Notice: Subject to any disclaimer, the term of this patent is extended or adjusted under 35 U.S.C. 154(b) by 0 days.

(21) Appl. No.: 15/467,430

(22) Filed: Mar. 23, 2017

(65) Prior Publication Data

US 2017/0276841 A1    Sep. 28, 2017

(30) Foreign Application Priority Data

Mar. 25, 2016  (EP) ..................... 16162458

(51) Int. Cl.
*G02B 6/12* (2006.01)
*G02B 5/00* (2006.01)
(Continued)

(52) U.S. Cl.
CPC ........... *G02B 5/008* (2013.01); *G02B 5/0257* (2013.01); *G02B 5/0284* (2013.01);
(Continued)

(58) Field of Classification Search
CPC .... G02B 5/008; G02B 5/0257; G02B 5/0284; G02B 6/1226; G02B 6/13; G02B 2207/101
See application file for complete search history.

(56) References Cited

U.S. PATENT DOCUMENTS 8,480,958 B2 *  7/2013  Gomez Rivas .... G01N 21/6428
                                        422/82.07
8,698,096 B2 *  4/2014  Chen ..................... B01J 19/12
                                        250/208.2
(Continued)

FOREIGN PATENT DOCUMENTS

EP     2 884 260 A1    6/2015

OTHER PUBLICATIONS

Vercruysse, Dries et al., "Unidirectional Side Scatting of Light by a Single-Element Nanoantenna", Nano Letters, vol. 13, 2013, pp. 3843-3849.
(Continued)

*Primary Examiner* — Rhonda Peace
(74) *Attorney, Agent, or Firm* — McDonnell Boehnen Hulbert & Berghoff LLP

(57) ABSTRACT

The disclosure relates to wavelength-controlled directivity of all-dielectric optical nanoantennas. One example embodiment is an optical nanoantenna for directionally scattering light in a visible or a near-infrared spectral range. The optical nanoantenna includes a substrate. The optical nanoantenna also includes an antenna structure disposed on the substrate. The antenna structure includes a dielectric material having a refractive index that is higher than a refractive index of the substrate and a refractive index of a surrounding medium. The antenna structure includes a structure having two distinct end portions. The antenna structure is asymmetric with respect to at least one mirror reflection in a plane that is orthogonal to a plane of the substrate.

20 Claims, 14 Drawing Sheets

(11 of 14 Drawing Sheet(s) Filed in Color)

(51) Int. Cl.
*G02B 5/02* (2006.01)
*G02B 6/122* (2006.01)
*G02B 6/13* (2006.01)

(52) U.S. Cl.
CPC ............ *G02B 6/1226* (2013.01); *G02B 6/13* (2013.01); *G02B 2207/101* (2013.01)

(56) References Cited

U.S. PATENT DOCUMENTS

| | | | | |
|---|---|---|---|---|
| 8,988,754 | B2* | 3/2015 | Sun | G02B 6/26 359/238 |
| 9,075,010 | B2* | 7/2015 | Moerner | G01N 21/64 |
| 9,279,937 | B2* | 3/2016 | Roh | G02B 6/1226 |
| 9,632,216 | B2* | 4/2017 | Han | G02B 5/008 |
| 9,677,936 | B2* | 6/2017 | Han | G01J 3/28 |
| 9,726,788 | B2* | 8/2017 | Lee | G02B 5/008 |
| 2011/0163932 | A1* | 7/2011 | Mosbacker | H01Q 23/00 343/824 |
| 2012/0003449 | A1* | 1/2012 | Yializis | B05D 1/60 428/213 |
| 2014/0264026 | A1* | 9/2014 | Brown | G01N 21/35 250/338.1 |
| 2017/0276841 | A1* | 9/2017 | Li | G02B 5/008 |

OTHER PUBLICATIONS

Grahn, P. et al., "Electromagnetic Multipole Theory for Optical Nanomaterials", New Journal of Physics, vol. 14, 2012, 093033, 11 pages.
Johnson, P.B. et al., "Optical Constants of the Noble Metals", Physical Review B, vol. 6, No. 12, Dec. 15, 1972, pp. 4370-4379.

* cited by examiner

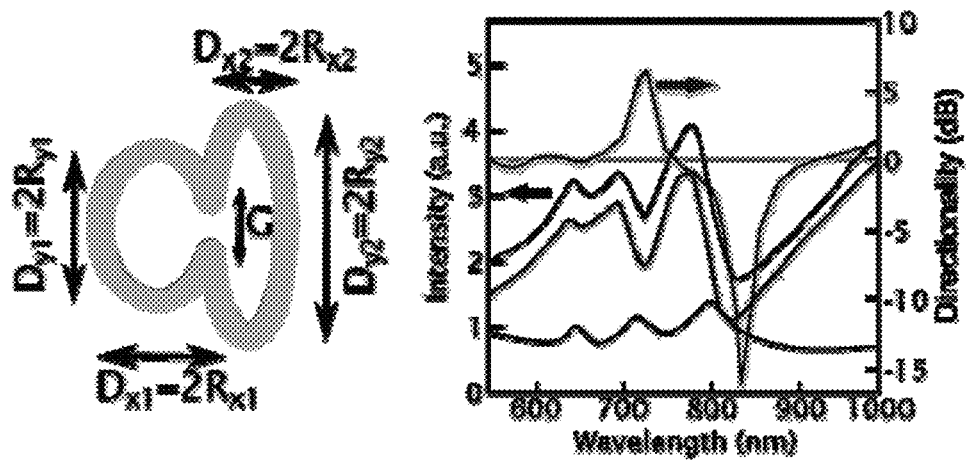
FIG. 1 – PRIOR ART
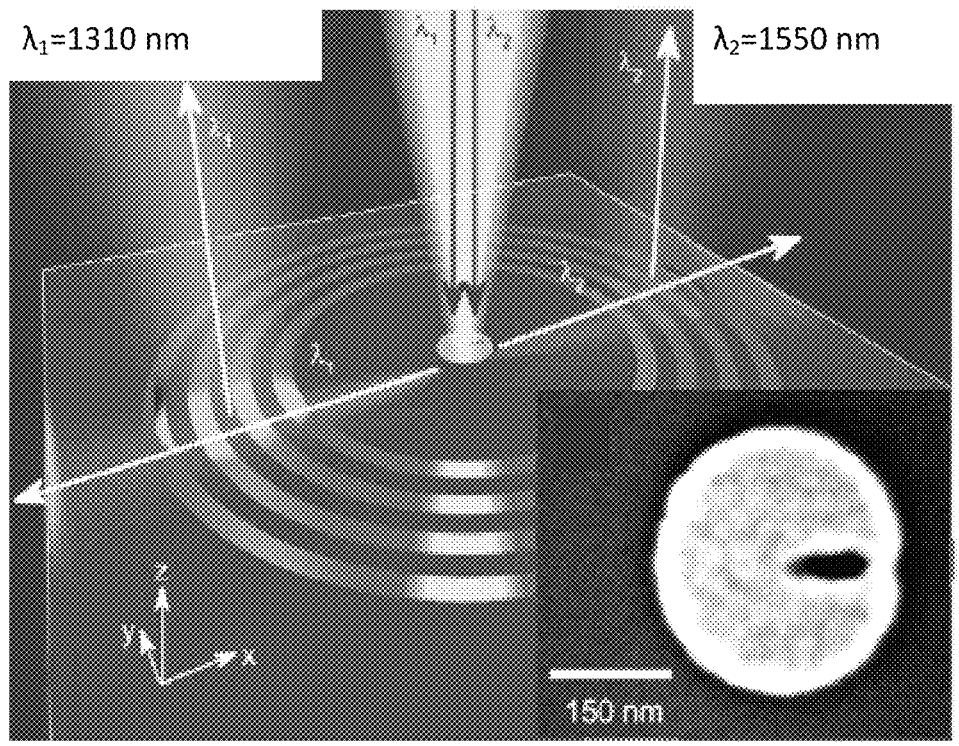
FIG. 2 – PRIOR ART

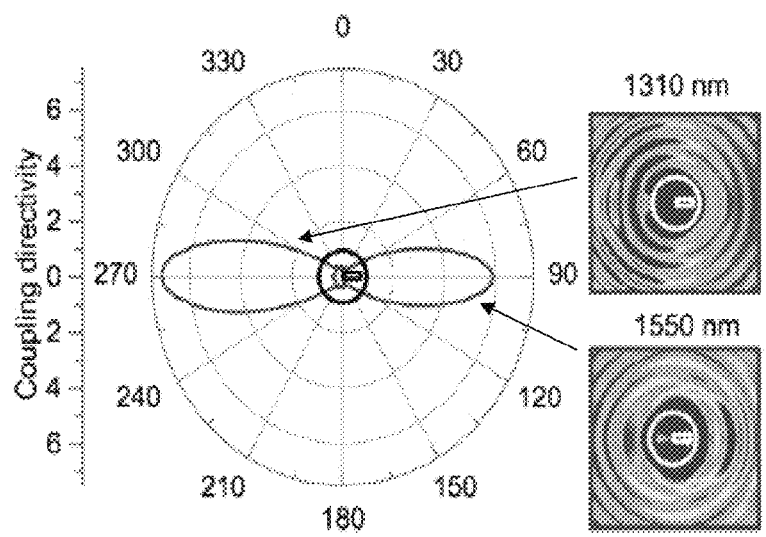
FIG. 3 – PRIOR ART
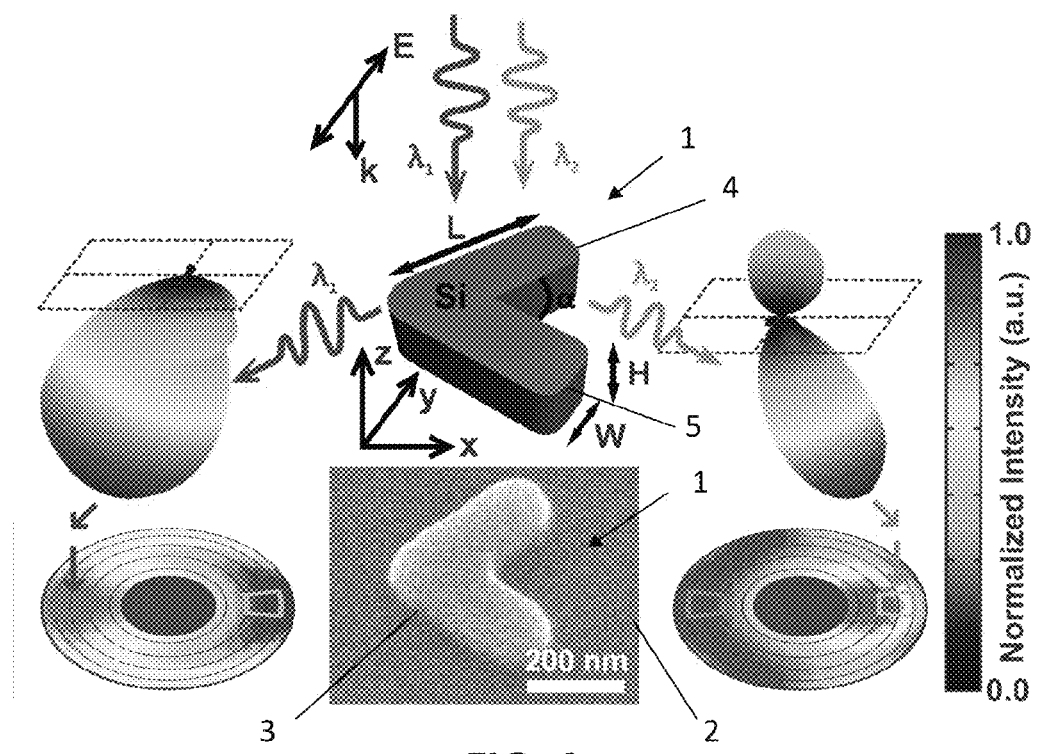
FIG. 4

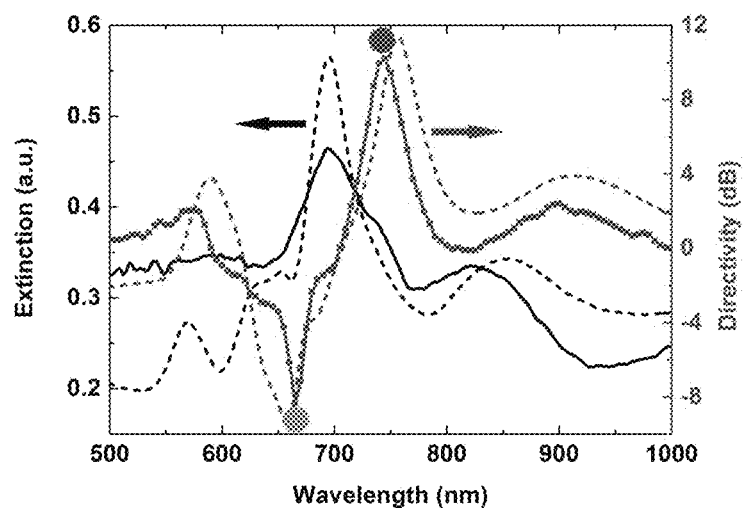
FIG. 6A
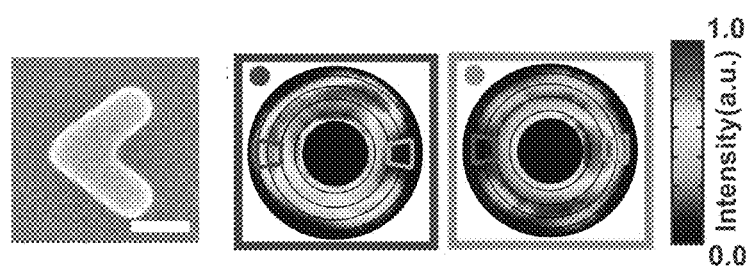
FIG. 6B  FIG. 6C

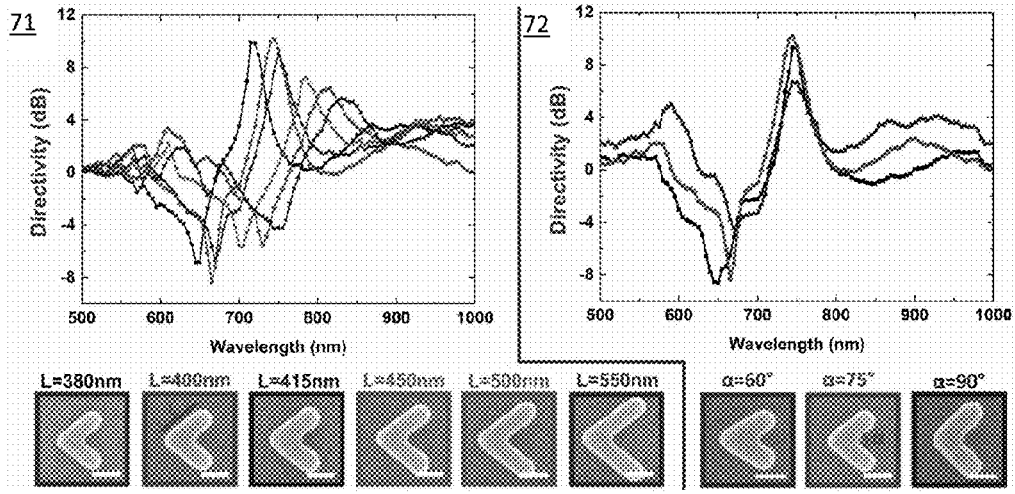
FIG. 7
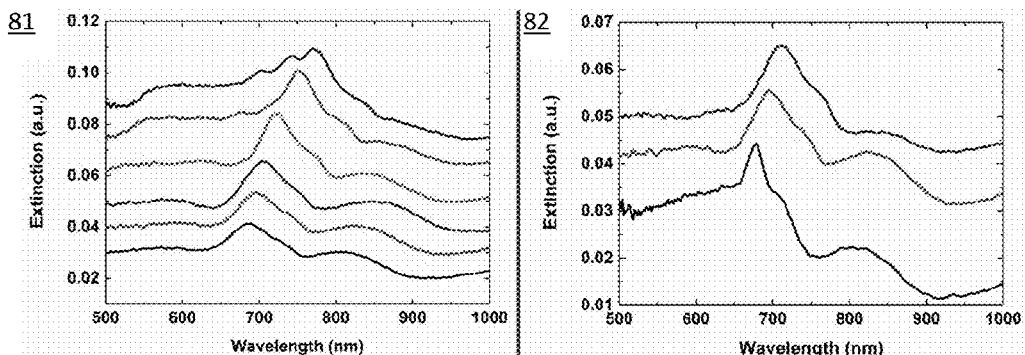
FIG. 8
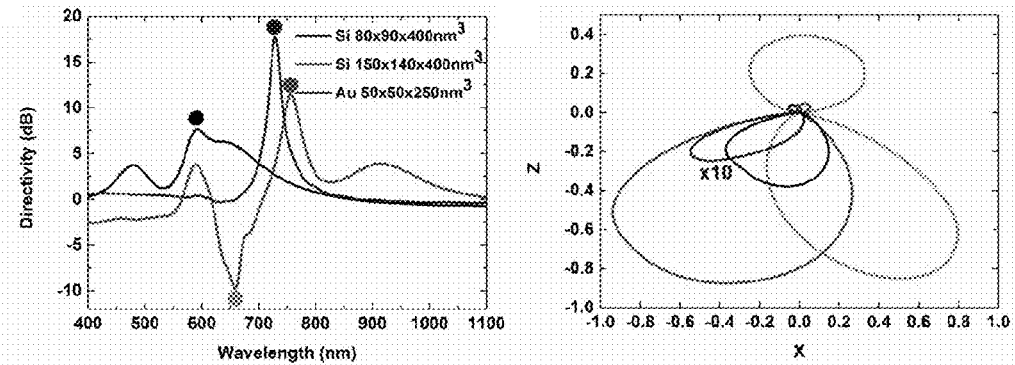
FIG. 9 FIG. 10

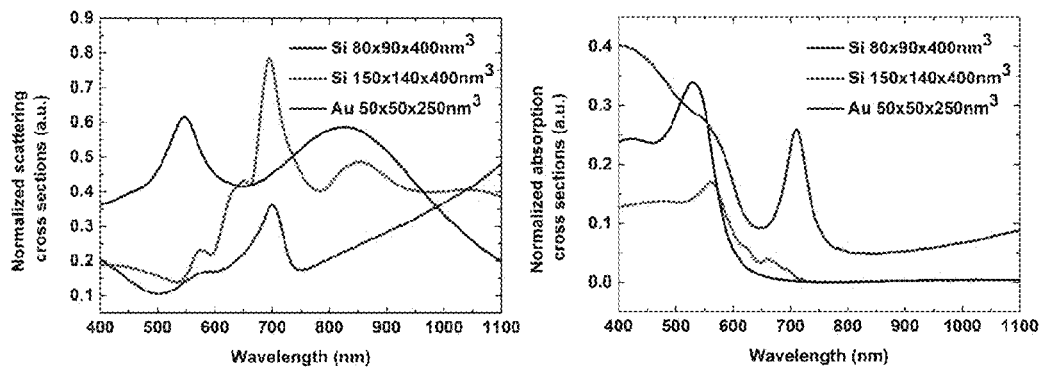
FIG. 11   FIG. 12
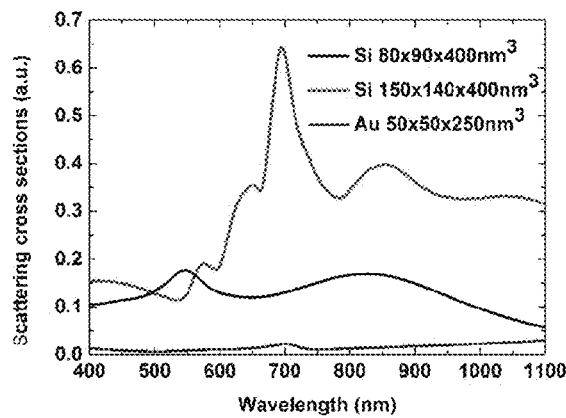
FIG. 13
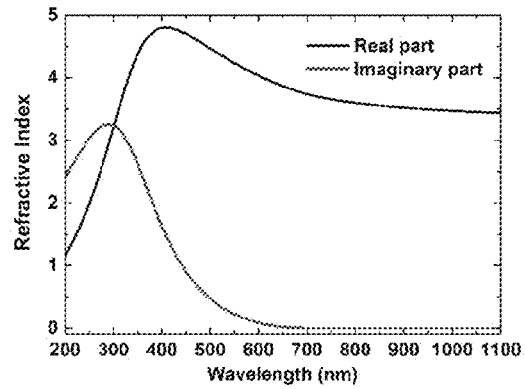
FIG. 14

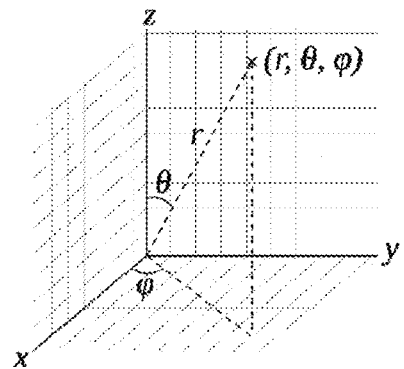
FIG. 15
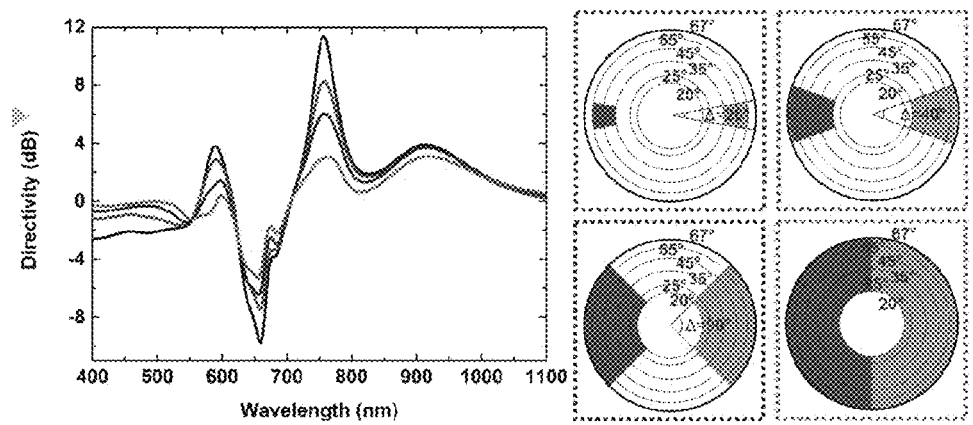
FIG. 16
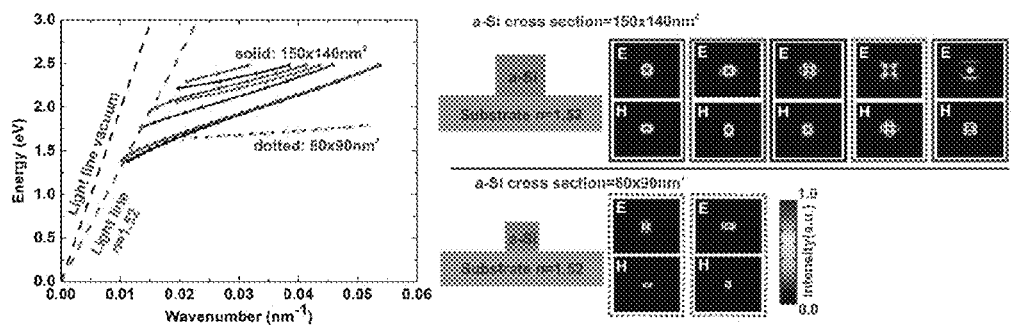
FIG. 17A  FIG. 17B

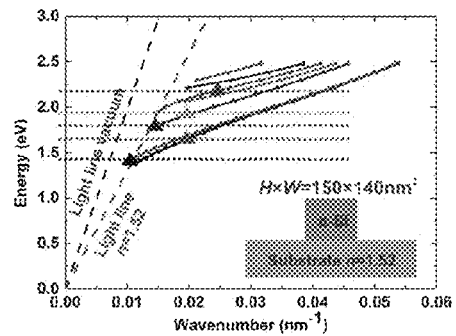
FIG. 18A
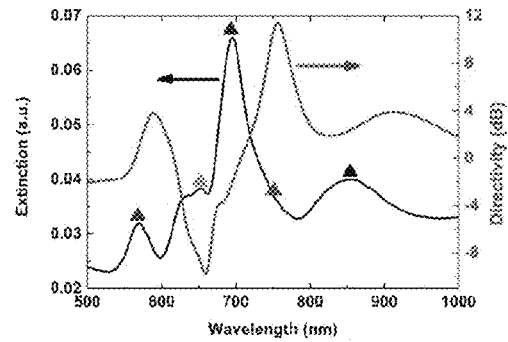
FIG. 18B
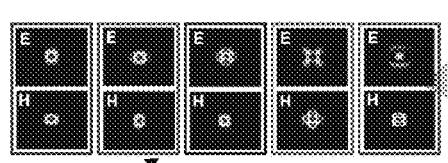
1801 FIG. 18C
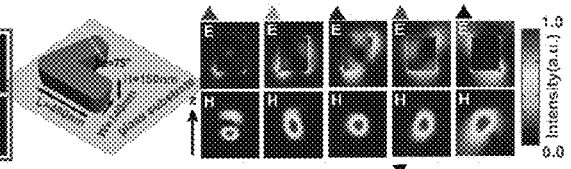
1802 FIG. 18D
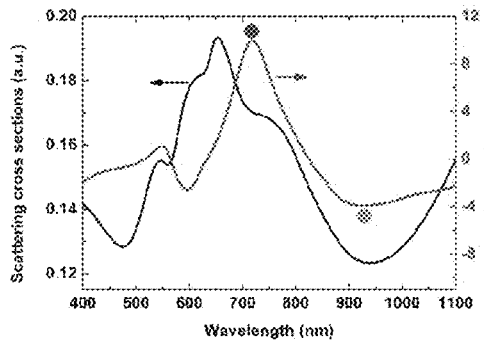
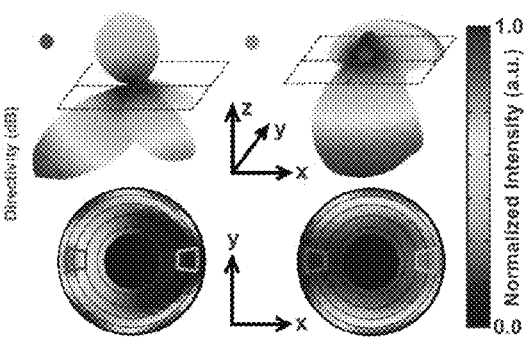
FIG. 19 – PRIOR ART

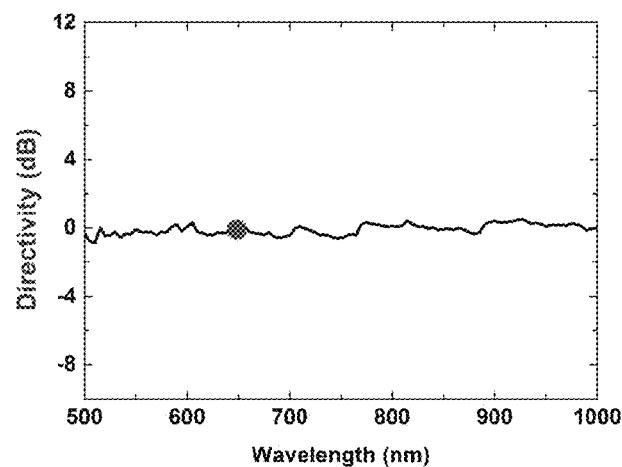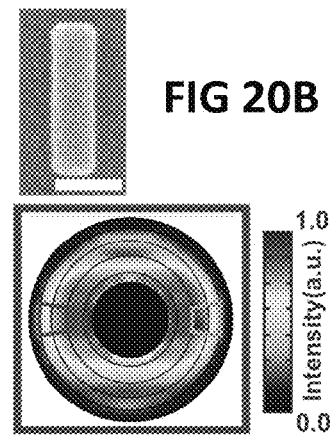
FIG. 20A     FIG. 20B
        FIG. 20C
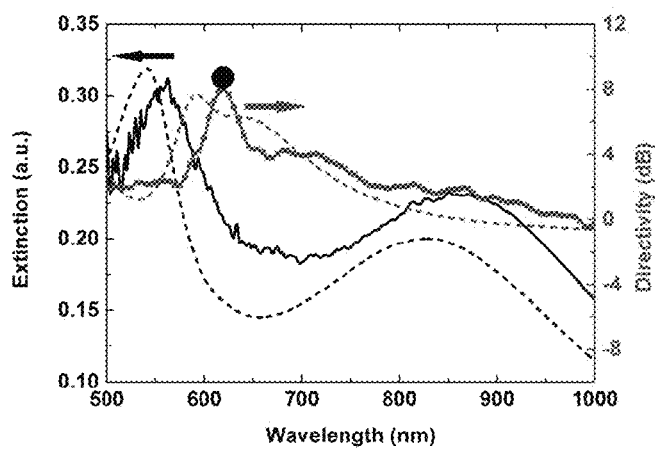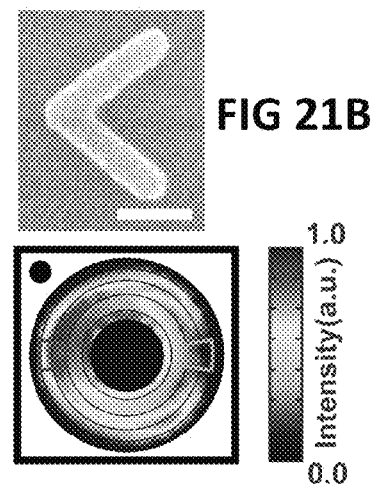
FIG. 21A     FIG. 21B
        FIG. 21C

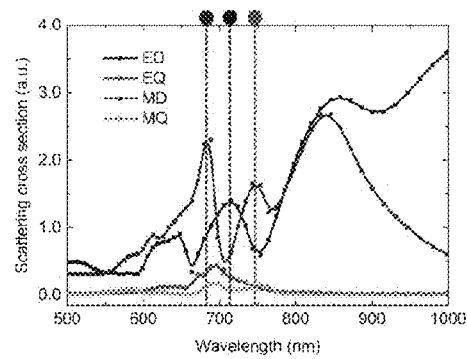 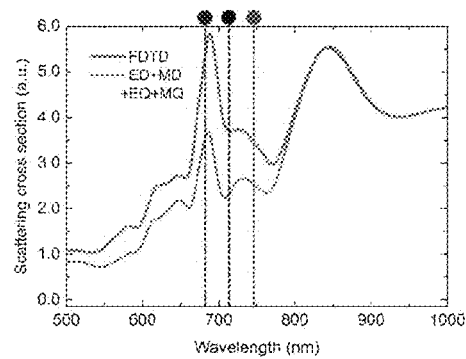
FIG. 23A  FIG. 23B
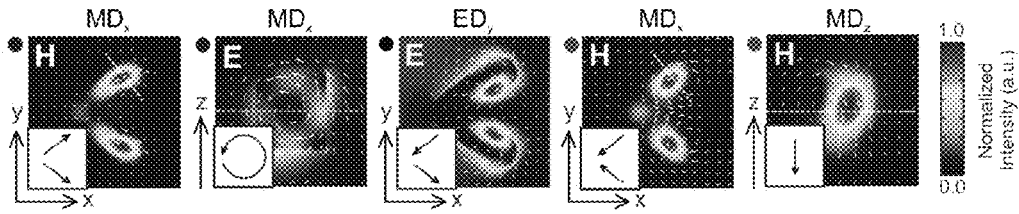
FIG. 23C

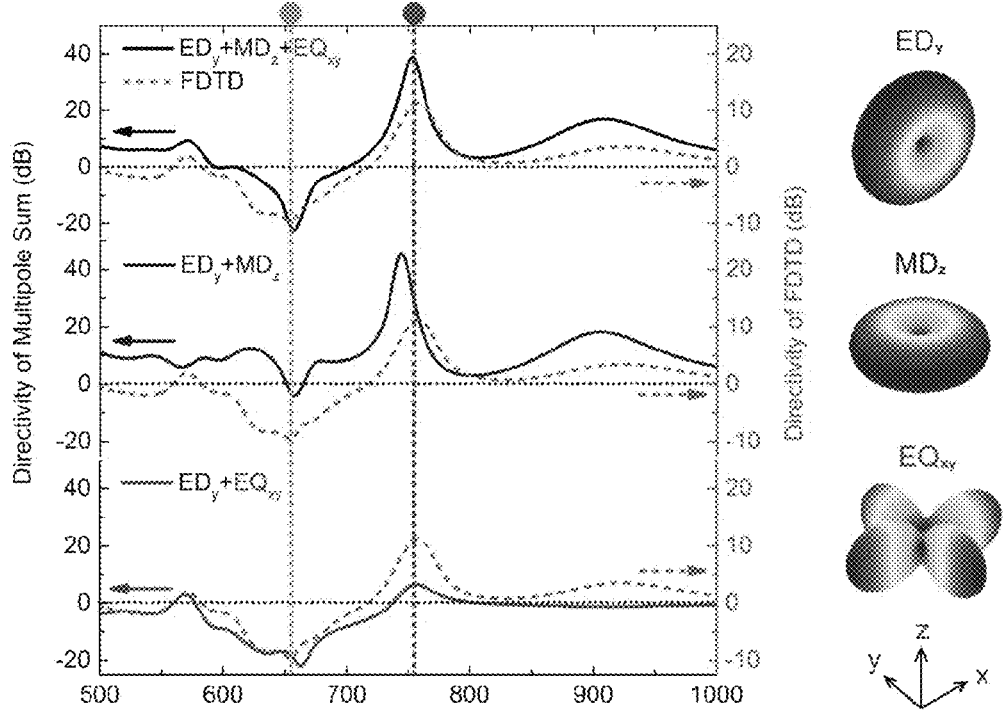
FIG. 24A
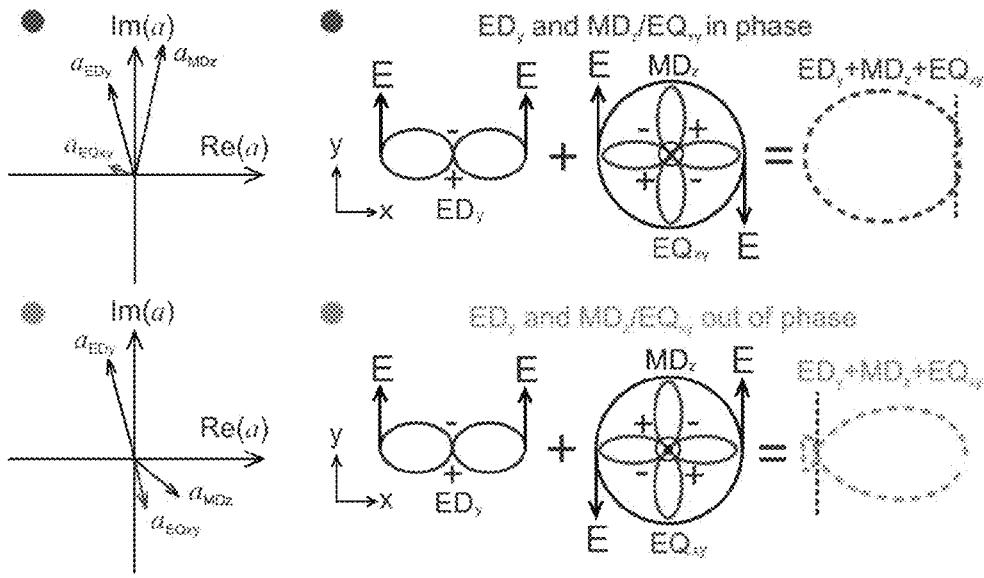
FIG. 24B  FIG. 24C

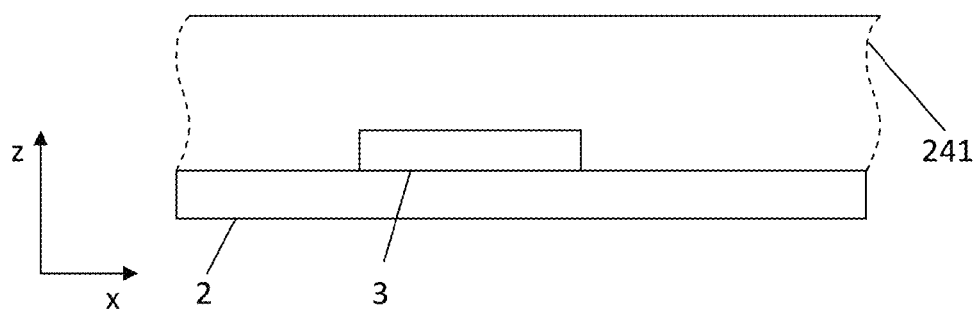
FIG. 25
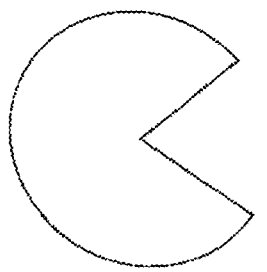
FIG. 26
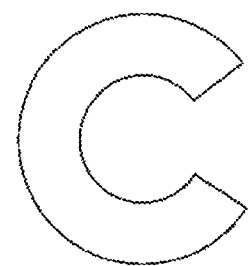
FIG. 27
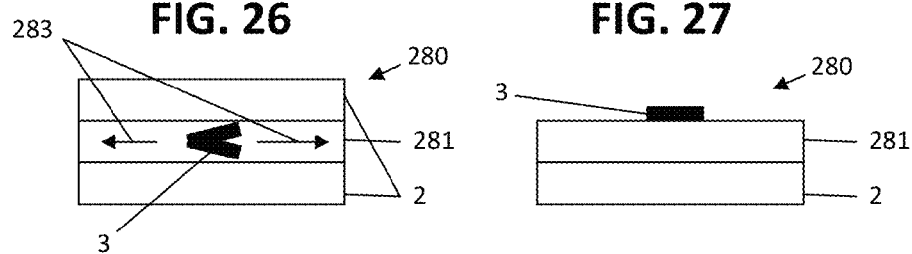
FIG. 28
FIG. 29
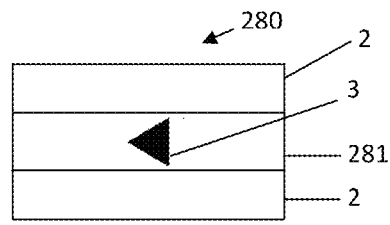
FIG. 30
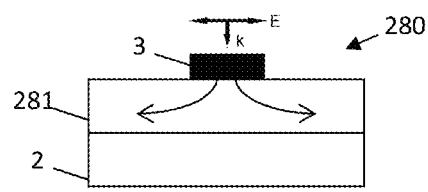
FIG. 31

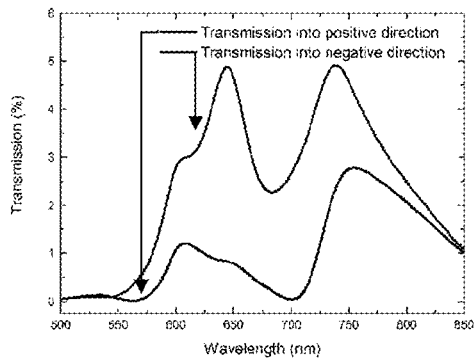
FIG. 32
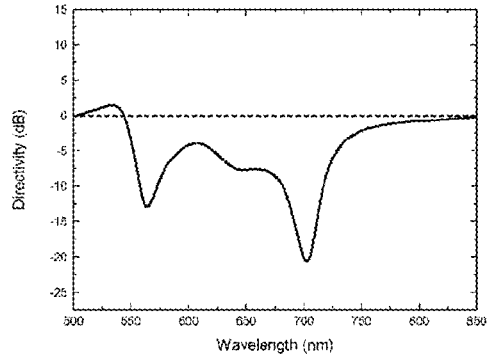
FIG. 33
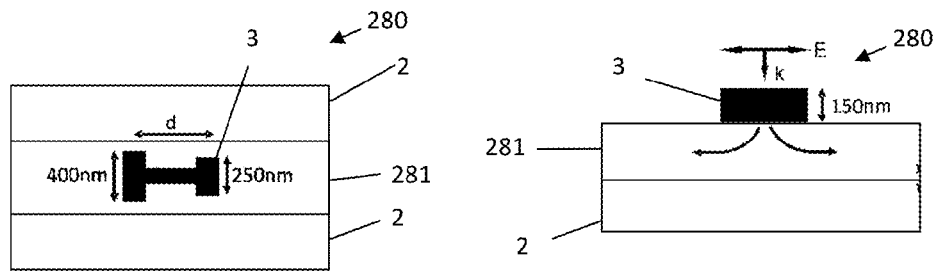
FIG. 34
FIG. 35
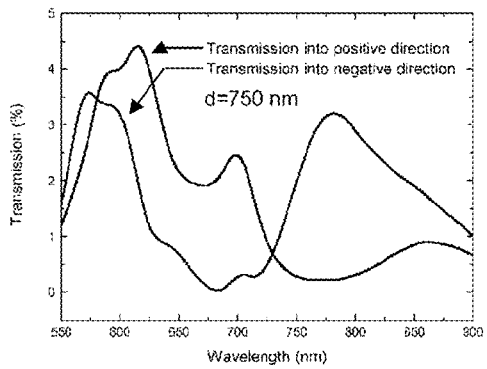
FIG 36.
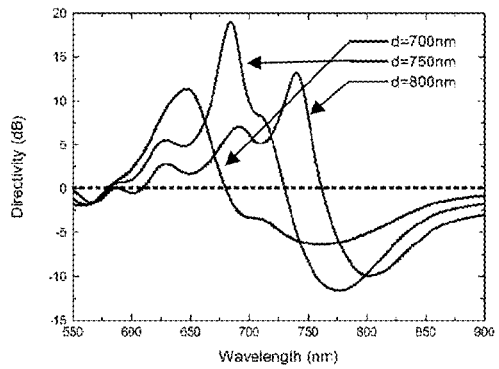
FIG. 37
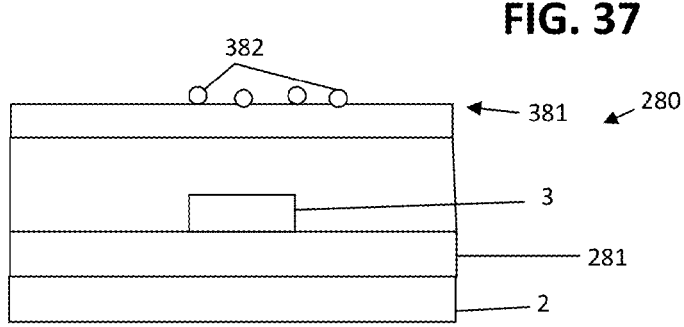
FIG. 38

WAVELENGTH-CONTROLLED DIRECTIVITY OF ALL-DIELECTRIC OPTICAL NANO-ANTENNAS

CROSS-REFERENCE TO RELATED APPLICATIONS

The present application is a non-provisional patent application claiming priority to European Patent Application No. EP 16162458.0, filed Mar. 25, 2016, the contents of which are hereby incorporated by reference.

FIELD OF THE DISCLOSURE

The present disclosure relates to the field of nanoscale optical antennas. More specifically it relates to an optical nanoantenna for directionally scattering light and a related method for manufacturing such optical nanoantenna having a predetermined light scattering directionality.

BACKGROUND

Optical nanoantennas convert freely propagating optical radiation into localized energy in the subwavelength scale, and vice versa. They may be considered as the optical analogues of microwave and radiowave antennas, which are omnipresent in modern society and have a major impact on our daily life. Such optical nanoantennas may have revolutionized the way we wield light. An important characteristic of the optical nanoantenna is the scattering directivity, e.g. in which directions it can efficiently transmit or receive power. Optical antennas may therefore provide light ray redirection into engineered directions at a subwavelength scale. Design of optical nanoantennas with controllable scattering directivity is strongly desirable for a broad range of applications, e.g. in photodetection, fluorescence emission, sensing, colour routing, spectroscopy and so on. Thus, nanoantenna applications may range from advanced photodetection and optical communication to biomedical sensing and near-field microscopy.

A nanoantenna may be considered as a subwavelength bridge between free space optical radiation and localized energy. The localized electromagnetic modes may strongly depend on its geometry and material composition. The material composition and geometry, as well as the surrounding medium, strongly affect the localized electromagnetic modes they support, and consequently determines how optical radiation is received and transmitted. It is greatly desirable to obtain optical nanoantennas with controllable directionality, featuring directed signal reception and transmission with high efficiencies.

It is known in the art to use plasmonic, e.g. metallic, nanoantennas for this purpose. Plasmonic structures have been extensively exploited for nanoantenna design. Such metallic nanoantennas, e.g. a gold V-shaped antenna, a gold Yagi-Uda array antenna or a split-ring resonator, are based on localized surface plasmon resonance (LSPR). However, the intrinsic ohmic losses of metals may be large, e.g. particularly in the visible range, which may impede further efficiency improvement for practical applications. In this type of antenna, the relatively weak magnetic response to the incident light may restrict further engineering of high-performance nanoantennas of this type. Furthermore, since the interaction of metallic nanoantennas with the magnetic component of light may be relatively weak, highly tunable scattering directionality may be difficult to achieve.

Most of the reported directional plasmonic nanoantennas only direct light into one particular engineered direction, and the directivity is difficult to switch into other directions. In addition, intrinsic absorption losses of metals are especially high in the visible range, and the power of the scattered light for a plasmonic nanoantenna is relatively low. Therefore, an opportunity exists for further improvement for practical applications.

Particular plasmonic nanostructures are known in the art which can achieve switched directional scattering into opposite directions, e.g. as disclosed in the European patent application EP 13197308. For example, a double split-ring resonator as known in the art is illustrated in FIG. 1. In such prior-art device, two face-to-face arranged split-ring resonators having different geometries are merged, such that each split-ring resonator part contributes to the light scattering into one direction at a particular wavelength. Thus, directional scattering into opposite directions can be obtained in a device as known in the art. However, the design of such double split-ring resonator structure should be carefully optimized, e.g. the geometric parameters, such as the sizes of the split-ring resonators and the distance and the gap size in between the split-ring resonators, is to be carefully engineered to obtain the desired directivity as function of wavelength.

Another prior-art example is the circular patch nanoantenna with a rod-shaped nanoslit, e.g. a plasmonic nanodisk antenna with a rod-shaped aperture as shown in FIG. 2. In such device, the interference between the resonances of the patch nanoantenna and the nanoslit, also referred to as Fano resonance in the art, results in a dual directional scattering of light into opposite directions at different wavelengths. However, this may have been only demonstrated in the near-infrared range, e.g. near-infrared light in the telecommunication band. The coupling directivity of this prior-art device is shown in detail in FIG. 3.

It has been suggested that all-dielectric nanoantennas, made of high refractive index materials such as silicon, could provide efficient optical manipulation at the nanoscale. For example, it is known in the art that high-index dielectric nanoparticles can exhibit both strong electric and magnetic resonances, which are tunable throughout the visible spectrum, while intrinsic absorption losses may be small due to the low imaginary part of the refractive index. These distinctive properties may enable optimized manipulation of electromagnetic radiation. For example, directional scattering with high forward-to-backward scattering ratio along the propagation direction has been observed for spherical silicon nanoparticles due to the interference between electric and magnetic dipole resonances. Furthermore, rotation of the scattering direction has also been theoretically predicted in asymmetric silicon nanodimers.

SUMMARY

Example embodiments provide for selectively directing light in the visible and/or the near infrared spectral range, e.g. scattering visible light into diametrically opposite directions, in which the direction of light scattering can be selected as function of wavelength.

The above may be accomplished by a method and device according to embodiments. For example, in accordance with embodiments, the scattering direction may be effectively controlled by the incident wavelength.

Some embodiments provide a straightforward nanoantenna, e.g. straightforward to design and manufacture.

Some embodiments of the nanoantenna can be manufactured using CMOS technology compatible processing. In some embodiments, a nanoantenna can be manufactured using a CMOS compatible material, e.g. the abundant material silicon, which is compatible with CMOS technology. Further, integration with other nano-photonic systems can thus be achieved.

In some embodiments, a high scattering power can be achieved, e.g. substantially higher than that of a metallic nanoantenna with optimized scattering directivity.

In some embodiments, switched directivity into diagonally opposed directions in a narrow visible or near infrared spectral range, e.g. a range of about 70 nm to 100 nm, e.g. 80 nm or 90 nm, can be achieved. For example, alternative plasmonic nanoantennas may be limited to switching to other directions over a spectral range larger than 100 nm.

In some embodiments, a nanoantenna can be used as a passive bidirectional wavelength router.

In some embodiments, a scattering cross section of a nanoantenna can be achieved that may be considerably higher than that of a comparable gold surface plasmon resonance antenna.

In some embodiments, the geometry of an optical nanoantenna can be tuned, e.g. the geometry of the antenna structure can be engineered such that, light can be scattered into two diagonally opposed directions in the visible or near infrared light spectral range. For example, over a spectral range of less than 100 nm, the scattering directionality may gradually shift from a leftward to a rightward direction. Thus, an optical nanoantenna can be provided with wavelength-controlled scattering directivity, e.g. that scatters light into different directions controlled by the wavelength of the incident light.

In some embodiments, a nanoantenna can be implemented in a low-loss optical device that offers control over the scattering directionality.

In some embodiments, a nanoantenna may have a high scattering power, e.g. a high scattering cross section and low absorption losses.

In a first aspect, the disclosure relates to an optical nanoantenna for directionally scattering light in the visible and/or the near infrared spectral range. The optical nanoantenna comprises, e.g. consists of, a substrate and an antenna structure on the substrate.

The antenna structure is composed of a dielectric material having a refractive index that is higher than the substrate and a surrounding medium, e.g. a surrounding liquid, a surrounding air medium or another dielectric layer. The antenna structure may be composed of a dielectric material having a refractive index in the range of 2.5 to 6.0.

The antenna structure is a simply-connected structure having two distinct end portions.

The antenna structure is asymmetric with respect to at least one mirror reflection in a plane that is orthogonal to the plane of the substrate.

The antenna structure may have has a longitudinal length in the range of 500 nm to 1.5 µm.

In an optical nanoantenna according to example embodiments, the optical nanoantenna may have a wavelength-controlled scattering directivity, in which the antenna structure may be adapted for scattering light in the visible or near-infrared spectral range into two diagonally opposed directions, the direction of scattering being dependent on the wavelength of the light.

In an optical nanoantenna according to example embodiments, the antenna structure may have a reflection symmetry with respect to a plane of symmetry, in which this plane of symmetry is orthogonal to the plane of the substrate, such as to form two connected parts of the antenna structure, each part being mirror symmetric with respect to the other part.

In an optical nanoantenna according to example embodiments, the connected parts may be connected to each other at an acute angle.

In an optical nanoantenna according to example embodiments, the simply-connected structure may have a cross-sectional width in the range of 80 nm to 150 nm and a cross-sectional height in the range of 80 nm to 150 nm.

In an optical nanoantenna according to example embodiments, the simply-connected structure may have a rectangular cross-sectional shape.

In an optical nanoantenna according to example embodiments, each of the connected parts may have a cross-sectional width in the range of 80 nm to 150 nm and a cross-sectional height in the range of 80 nm to 150 nm.

In an optical nanoantenna according to example embodiments, each of the connected parts may have a longitudinal length in the range of 300 nm to 650 nm.

In an optical nanoantenna according to example embodiments, the two parts may be connected at an angle to form a V-shape, the angle being in the range of 60 degrees to 90 degrees.

In an optical nanoantenna according to example embodiments, the connected parts may have a rectangular cross-sectional shape.

In an optical nanoantenna according to example embodiments, the antenna structure may be V-shaped.

In an optical nanoantenna according to example embodiments, the antenna structure may have the shape of a triangle, e.g. of an isosceles triangle.

In an optical nanoantenna according to example embodiments, the antenna structure may be H-shaped. For example, the antenna structure may comprise two parallel bars having different lengths, connected at their respective center to each other by a third bar that is perpendicular to the two parallel bars.

In an optical nanoantenna according to example embodiments, the dielectric material may be amorphous silicon.

An optical nanoantenna according to example embodiments may be adapted for directionally scattering light in the visible and/or the near infrared spectral range into two opposite directions of a waveguide, e.g. in a wavelength dependent manner.

Embodiments may also relate to an integrated waveguide structure comprising a waveguide and an optical nanoantenna according to example embodiments, the optical nanoantenna being positioned above the waveguide, e.g. on top of the waveguide, such that the directionally scattered light is projected into two opposite directions of the waveguide. For example, the waveguide may be formed in or on the substrate of the optical nanoantenna.

In an integrated waveguide structure according to example embodiments, the optical nanoantenna may have a wavelength-controlled scattering directivity, and the antenna structure may be adapted for scattering light in the visible or near-infrared spectral range into the waveguide in two diagonally opposed directions along a longitudinal axis of the waveguide. The direction of scattering may be dependent on the wavelength of the light, e.g. different color components of the incident light may be coupled into different directions of the waveguide.

In an integrated waveguide structure according to example embodiments, the longitudinal axis of the waveguide may lie in the plane of symmetry of the antenna structure.

An integrated waveguide structure according to example embodiments may also comprise a surface that is functionalized such as to capture entities labelled with fluorescent dies, e.g. comprising at least two different die species for respectively emitting light having at least two different spectra. The surface may be arranged above the antenna structure such that light emitted from the fluorescent dies impinges on the antenna structure and is coupled into the waveguide.

In a second aspect, the disclosure relates to a method for manufacturing an optical nanoantenna having a predetermined scattering directionality for light in the visible and/or the near infrared spectral range, comprising: providing a substrate, and providing an antenna structure composed of a dielectric material having a refractive index in the range of 2.5 to 6.0 on the substrate, the antenna structure being a simply-connected structure, having two distinct end portions. This antenna structure is asymmetric with respect to at least one mirror reflection in a plane that is orthogonal to the plane of the substrate. The antenna structure may have a longitudinal length in the range of 500 nm to 1.5 μm.

In a method according to example embodiments, the step of providing the antenna structure may comprise depositing an amorphous silicon film having a thickness in the range of 80 nm to 150 nm on a semiconductor wafer to provide a cross-sectional height in the range of 80 nm to 150 nm of the antenna structure.

In a method according to example embodiments, the amorphous silicon film may be deposited using radio-frequency plasma enhanced chemical vapor deposition.

In a method according to example embodiments, the step of providing the antenna structure may comprise using electron-beam lithography followed by dry reactive ion etching.

In a method according to example embodiments, the step of providing the antenna structure may comprise the application of a negative photoresist, patterning the negative photoresist using electron-beam lithography, inductively coupled plasma etching of the patterned negative photoresist and removing the remaining negative photoresist.

In a method according to example embodiments, the electron-beam lithography may be used to define the antenna structure as a V-shaped structure, a H-shaped structure, e.g. comprising two parallel bars of different length that are connected by a crossbar that is perpendicular to the two parallel bars, or a triangular structure, e.g. an isosceles triangular structure.

In a method according to example embodiments, the electron-beam lithography may form the V-shaped antenna structure in which two parts are connected at an angle to form the V-shape, the angle being in the range of 60 degrees to 90 degrees.

In a further aspect, the present disclosure relates to the use of an optical nanoantenna in accordance with the first aspect of the present disclosure for providing controllable light scattering directivity in photodetection, fluorescence emission, sensing, color routing and/or spectroscopy applications.

In a yet further aspect, the present disclosure relates to the use of an optical nanoantenna in accordance with the first aspect of the present disclosure for providing controllable light scattering directivity in biomedical sensing and/or near-field microscopy applications, such as in cytometry.

Particular aspects are set out in the accompanying independent and dependent claims. Features from the dependent claims may be combined with features of the independent claims and with features of other dependent claims as appropriate and not merely as explicitly set out in the claims.

These and other aspects will be apparent from and elucidated with reference to the embodiment(s) described hereinafter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 illustrates a plasmonic antenna for directional light routing, according to the prior art.

FIG. 2 illustrates an antenna structure for directional light routing, according to the prior art.

FIG. 3 shows the coupling directivity of an antenna structure as shown in FIG. 2, according to the prior art.

FIG. 4 illustrates an optical nanoantenna, according to example embodiments.

FIG. 6A illustrates the extinction and directivity spectra relating to a nanoantenna, according to example embodiments with a cross section of 150×140 nm$^2$.

FIG. 6B illustrates a SEM image relating to a nanoantenna, according to example embodiments with a cross section of 150×140 nm$^2$.

FIG. 6C illustrates a BPF image relating to a nanoantenna, according to example embodiments with a cross section of 150×140 nm$^2$.

FIG. 7 illustrates a dependence of the scattering directivity on arm length and opening angle of a nanoantenna, along with corresponding SEM images, according to example embodiments.

FIG. 8 illustrates a dependence of the extinction on arm length and opening angle of a nanoantenna, according to example embodiments.

FIG. 9 illustrates a comparison of the scattering directivity between a gold plasmonic nanoantenna as known in the art and nanoantennas according to example embodiments.

FIG. 10 shows a comparison of xz-plane scattering between a gold plasmonic nanoantenna as known in the art and nanoantennas in accordance with example embodiments.

FIG. 11 illustrates a comparison of normalized scattering cross-section profiles between a gold plasmonic nanoantenna as known in the art and nanoantennas according to example embodiments.

FIG. 12 illustrates a comparison of normalized absorption cross-section profiles between a gold plasmonic nanoantenna as known in the art and nanoantennas according to example embodiments.

FIG. 13 illustrates a comparison of absolute scattering cross-section profiles between a gold plasmonic nanoantenna as known in the art and nanoantennas according to example embodiments.

FIG. 14 illustrates the refractive index of an amorphous silicon material deposited by PECVD, according to example embodiments.

FIG. 15 illustrates spherical coordinates used in a calculation of directivity, according to example embodiments.

FIG. 16 illustrates a calculation of directivity using different angular regions, according to example embodiments.

FIG. 17A illustrates dispersion curves.

FIG. 17B illustrates modal field profiles showing the supported localized modes of a simulated Si strip waveguide on a glass substrate.

FIG. 18A illustrates dispersion curves and resonant energies.

FIG. 18B illustrates the extinction and directivity spectra, according to example embodiments.

FIG. 18C illustrates the electromagnetic modes supported by a strip-waveguide.

FIG. 18D illustrates the electromagnetic modes supported by the V-shaped nanoantenna, according to example embodiments.

FIG. 19 illustrates scattering cross sections, directivity, 3D scattering patterns, and 2D projections at selected wavelengths of a V-shaped gold plasmonic nanoantenna, according to the prior art.

FIG. 20A illustrates the directivity spectrum of a symmetric Si nanorod.

FIG. 20B illustrates an SEM image of a symmetric Si nanorod.

FIG. 20C illustrates a BFP image of a symmetric Si nanorod.

FIG. 21A illustrates the extinction and directivity spectra of 80×90 $nm^2$ cross section nanoantennas, according to example embodiments.

FIG. 21B illustrates an SEM image of 80×90 $nm^2$ cross section nanoantennas, according to example embodiments.

FIG. 21C illustrates a BFP image of 80×90 $nm^2$ cross section nanoantennas, according to example embodiments.

FIG. 23A illustrates a multipole decomposition of the scattering cross-section of a Si nanoantenna in a vacuum, according to example embodiments.

FIG. 23B illustrates a comparison of the scattering cross-section between the multipole sum and the FDTD result, according to example embodiments.

FIG. 23C illustrates an electric/magnetic field intensity distribution and vector plot at selected wavelengths, according to example embodiments.

FIGS. 24A-24C illustrates a directivity analysis based on multipole decomposition, according to example embodiments.

FIG. 24A illustrates a directivity spectra calculated by the multipole sum of selected modes (left axis) and an FDTD simulation (right axis). The horizontal dotted line is the zero directivity. The individual 3D scattering patterns of each selected mode are exhibited on the right column.

FIG. 24B illustrates a vector diagram depicting the complex multipole coefficients a for the $ED_y$, $MD_z$, and $EQ_{xy}$ modes at the directivity peak and dip, respectively (red and green dots).

FIG. 24C illustrates in-phase and out-of-phase interferences between the $ED_y$ and $MD_z/EQ_{xy}$ modes, which give rise to the directivity peak and dip, respectively (red and green dots). The vertical black dashed line accompanying the final scattering patterns indicates the x=0 position.

FIG. 25 illustrates an antenna structure, according to example embodiments.

FIG. 26 illustrates a shape of an antenna structure, according to example embodiments.

FIG. 27 illustrates a shape of an antenna structure, according to example embodiments.

FIG. 28 illustrates a top view of an integrated waveguide structure, according to example embodiments.

FIG. 29 illustrates a side view of an integrated waveguide structure, according to example embodiments.

FIG. 30 illustrates a top view of an optical nanoantenna having a triangular shape, according to example embodiments, in an integrated waveguide structure, according to example embodiments.

FIG. 31 shows a side view an optical nanoantenna having a triangular shape, according to example embodiments, in an integrated waveguide structure, according to example embodiments.

FIG. 32 illustrates the transmission of light as a function of wavelength in a simulation of an integrated waveguide structure, according to example embodiments comprising a triangularly shaped antenna structure.

FIG. 33 illustrates the directivity of light coupled into a waveguide as a function of wavelength in a simulation of an integrated waveguide structure, according to example embodiments comprising a triangularly shaped antenna structure.

FIG. 34 illustrates a top view of an H-shaped optical nanoantenna, according to example embodiments, in an integrated waveguide structure, according to example embodiments.

FIG. 35 illustrates a side view of an H-shaped optical nanoantenna, according to embodiments, in an integrated waveguide structure, according to example embodiments.

FIG. 36 illustrates the transmission of light as a function of wavelength in a simulation of an integrated waveguide structure, according to example embodiments comprising an H-shaped antenna structure.

FIG. 37 illustrates the directivity of light coupled into a waveguide as a function of wavelength in a simulation of an integrated waveguide structure, according to example embodiments comprising an H-shaped antenna structure.

FIG. 38 illustrates an integrated waveguide structure, according to example embodiments comprising a surface that is functionalized such as to capture entities labelled with fluorescent dies.

Figure 5A:
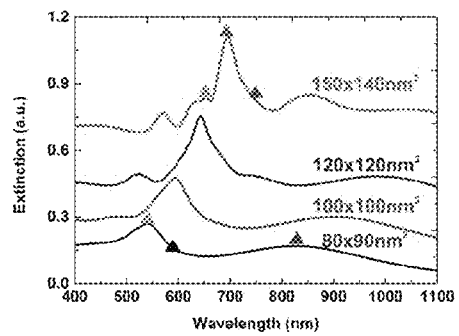
FIG. 5A illustrates a dependence of the extinction on the cross section of a nanoantenna, according to example embodiments.
Figure 5C:
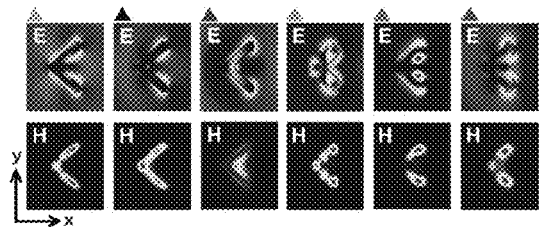
FIG. 5C illustrates a dependence of the extinction on the cross section of a nanoantenna, according to example embodiments.
Figure 5B:
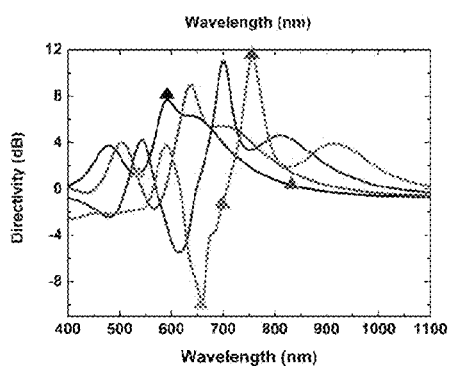
FIG. 5B illustrates a dependence of the directivity spectrum on the cross section of a nanoantenna, according to example embodiments.
Figure 5D:
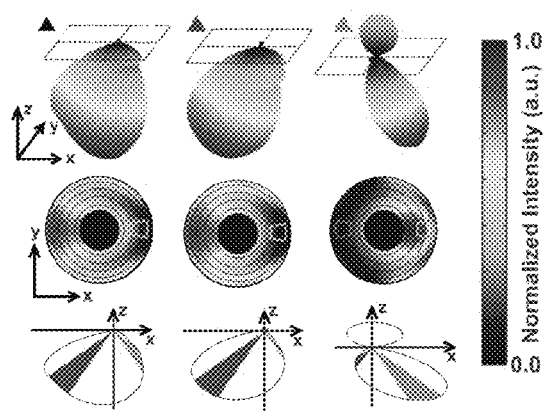
FIG. 5D illustrates a dependence of the directivity spectrum on the cross section of a nanoantenna, according to example embodiments.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION

The present invention will be described with respect to particular embodiments and with reference to certain drawings but the present disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the present invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this invention, in one or more embodiments.

Similarly it should be appreciated that in the description of example embodiments of the invention, various features of the invention are sometimes grouped together in a single embodiment, figure, or description thereof for the purpose of streamlining the invention and aiding in the understanding of one or more of the various inventive aspects. This method of disclosure, however, is not to be interpreted as reflecting an intention that the present invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the present invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a volume of space, e.g. the volume of an antenna structure, being simply-connected (or 1-connected), reference is made to the volume of space being path-connected, e.g. there is a path connecting every pair of points in this volume that is entirely contained in this volume, in which furthermore every path between two points can be continuously transformed, staying within the volume, into any other such path while preserving the two endpoints in question. In other words, the antenna structure is a single structure.

In a first aspect, the present disclosure relates to an optical nanoantenna for directionally scattering light in the visible and/or the near infrared spectral range. This optical nanoantenna comprises a substrate and an antenna structure on the substrate, in which the antenna structure is composed of a dielectric material having a refractive index that is higher than the substrate and a surrounding medium, e.g. a surrounding liquid, a surrounding air medium or another dielectric layer. The antenna structure may be composed of a dielectric material having a refractive index in the range of 2.5 to 6.0, e.g. in the range of 2.5 to 5.5, e.g. in the range of 3.5 to 5.0, e.g. in the range of 3.7 to 4.9, e.g. in the range of 4.0 to 5.0. The antenna structure is furthermore a simply-connected structure, which has two separate end portions, e.g. two distinct ends along the structure with respect to a longitudinal line of the structure are not connected to form a loop structure.

The antenna structure may have an elongate, simply-connected structure. For example, the antenna structure may have a simply-connected structure such as to form a V-shape, as illustrated in FIG. 4. However, the present disclosure also relates to antenna structures having different shapes, for example, an arc shape as illustrated in FIG. 27, or a circle segment shape as illustrated in FIG. 26.

The antenna structure is asymmetric with respect to at least one mirror reflection in a plane that is orthogonal to the plane of the substrate.

The antenna structure may have a longitudinal length in the range of 500 nm to 1.5 μm, e.g. a longitudinal length between the two distinct ends along a central longitudinal line of the antenna structure.

The antenna structure may have a reflection symmetry with respect to a single plane of symmetry, such as to form two connected parts of the antenna structure, each part being mirror symmetric with respect to the other part. These parts may be connected to each other at an acute angle. This plane of symmetry may be orthogonal to the plane of the substrate. Each of the connected parts may be an elongate structure that has a cross-sectional width in the range of 80 nm to 150 nm, e.g. 90 nm, 100 nm, 110 nm, 120 nm, 130 nm or 140 nm, and a cross-sectional height in the range of 80 nm to 150 nm, e.g. 90 nm, 100 nm, 110 nm, 120 nm, 130 nm or 140 nm. Each of the connected parts may have a longitudinal length in the range of 300 nm to 650 nm, e.g. 350 nm, 400 nm, 450 nm, 500 nm, 550 nm or 600 nm.

Referring to FIG. 4, an optical nanoantenna 1 for directionally scattering light in the visible or the near infrared spectral range, according to example embodiments, is shown.

The optical nanoantenna 1 comprises a substrate 2 and an antenna structure 3 on the substrate 2. The antenna structure may be deposited on top of the substrate, or may be integrally formed on the substrate, e.g. by etching away the surrounding substrate material. The substrate may consist of a slab of a single predetermined material, but may also consist of a plurality of layers having different composition. For example, the substrate may comprise glass or a semiconductor, such as silicon or germanium. However, embodiments are not necessarily limited to these materials. For example, the substrate may consist, or comprise, a polymer, e.g. a plastic, having properties suitable for the manufacture of optical integrated components. Furthermore, the dielectric material referred to hereinbelow may be deposited on top of such glass, semiconductor or other substrate material as a further layer, and etched, or otherwise selectively removed, to form the antenna structure in this dielectric material layer.

The antenna structure 3 is composed of a dielectric material having a refractive index that is higher than the substrate 2 and a surrounding medium 241, e.g. a surrounding liquid, a surrounding air medium or another dielectric layer, see for example FIG. 25.

The antenna structure 3 may be composed of a dielectric material having a refractive index in the range of 2.5 to 6.0. For example, this dielectric material may be amorphous silicon, germanium, gallium arsenide, diamond and/or silicon carbide. In some embodiments, the nanoantenna can be composed of a material, such as amorphous silicon, that has an extinction coefficient that is adequately low in a wavelength range of interest, e.g. in a visible or near-infrared light spectral range. Further, low absorption losses and an enhanced scattering efficiency can be achieved.

The antenna structure may be an all-dielectric structure, e.g. comprising no metallic elements contributing to, and/or significantly affecting, the optical antenna function, e.g. such that high intrinsic ohmic absorption losses can be avoided.

The antenna structure 3 is furthermore a simply-connected structure, e.g. may consist of a single body. The antenna structure has furthermore two distinct end regions, e.g. such as not to form a closed loop of the structure.

The antenna structure is asymmetric with respect to at least one mirror reflection in a plane that is orthogonal to the plane of the substrate.

Furthermore, the antenna structure may have a longitudinal length in the range of 500 nm to 1.5 μm.

The antenna structure 3 may have a reflection symmetry with respect to a plane of symmetry, e.g. an xz-plane in the coordinate system (x,y,z) shown in FIG. 4, in which this plane of symmetry is orthogonal to the plane of the substrate 2, e.g. the xy-plane of the substrate 2 in the coordinate system shown in FIG. 4. Thus, two connected parts 4,5 of the antenna structure may be formed, each part being mirror symmetric with respect to the other part. These parts may be connected to each other at an acute angle.

Each of the connected parts 4,5 may be an structure that has a cross-sectional width W in the range of 80 nm to 150 nm and a cross-sectional height H in the range of 80 nm to 150 nm.

The antenna structure may have substantially a rectangular cross-sectional shape. For example, the connected parts may have a rectangular cross-sectional shape, e.g. having a cross-sectional width W in a direction along the plane of the substrate and a cross-sectional height H in a direction perpendicular to the plane of the substrate. The cross-section may have a square shape. Each of the connected parts may have a longitudinal length L in the range of 300 nm to 650 nm. However, embodiments are not limited to rectangular cross-sectional shapes, e.g. the antenna structure, e.g. each of the connected parts, may have a circular cross-section or a triangular cross-section.

The optical nanoantenna 1 according to example embodiments may have a wavelength-controlled scattering directivity. Particularly, the antenna structure may be adapted for scattering light in the visible and/or the near infrared spectral range into two diagonally opposed directions, as shown in FIG. 4, in which this direction of scattering is dependent on the wavelength $\lambda_1$, $\lambda_2$ of the light.

According to example embodiments, the antenna structure 3 may be V-shaped. For example, the two connected parts 4,5 may be connected at an angle α to form this V-shape. This angle may, for example, be in the range of 60 degrees to 90 degrees. For example, for embodiments comprising an antenna structure composed of amorphous silicon material, an angle in the range of 60 degrees to 90 degrees may be selected.

However, embodiments are not limited to V-shaped antenna structures. For example, each part 4,5 may have a curved shape, e.g. a circle or ellipse arc segment, as illustrated in FIG. 26 and FIG. 27.

Preferably, the cross-section height and/or width of the parts may be constant over the length of the part. However, embodiments are not necessarily limited thereto. For example, the parts may have a tapered shape.

Referring to FIG. 30 and FIG. 31, in an optical nanoantenna according to example embodiments as shown, the antenna structure may have the shape of a triangle, e.g. of an isosceles triangle. For example, the antenna structure may comprise a simply-connected structure formed by the union of two abutting parts having the shape of right-angled triangles, joined together at coinciding edges of the parts that form a center line of the triangle. Thus, the two distinct end portions may be formed by corners of the two right-angled triangle parts that are opposite of the common edge forming the center line of the triangle.

Referring to FIG. 34 and FIG. 35, in an optical nanoantenna according to example embodiments, the antenna structure may be H-shaped. For example, the antenna structure may comprise two parallel bars, having different lengths, connected at their respective center to each other by a third bar that is perpendicular to the two parallel bars.

An optical nanoantenna according to example embodiments may be adapted for directionally scattering light in the visible and/or the near infrared spectral range into two opposite directions of a waveguide.

Embodiments may also relate to an integrated waveguide structure 280 comprising a waveguide, e.g. an integrated waveguide, such as a SiN waveguide, and an optical nanoantenna according to example embodiments. Referring to FIG. 28 to FIG. 31, FIG. 34 and FIG. 35, the antenna structure 3 may be positioned above the waveguide 281, e.g. on top of the waveguide 281, such that the directionally scattered light is projected into two opposite directions 283 of the waveguide. For example, the waveguide may be formed in or on the substrate 2 of the optical nanoantenna, for example a glass substrate.

In an integrated waveguide structure 280 according to example embodiments, the optical nanoantenna may have a wavelength-controlled scattering directivity, and the antenna structure 3 may be adapted for scattering light in the visible or near-infrared spectral range into two diagonally opposed directions 283 along a longitudinal axis of the waveguide. The direction of scattering may be dependent on the wavelength of the light. For example, different colors of light may be coupled into the waveguide in respectively different directions.

In an integrated waveguide structure according to example embodiments, the longitudinal axis of the waveguide 281 may lie in the plane of symmetry of the antenna structure.

Referring to FIG. 38, an integrated waveguide structure according to example embodiments may also comprise a surface 381 that is functionalized such as to capture entities 382 labelled with fluorescent dies, e.g. comprising at least two different die species for respectively emitting light having at least two different spectra. The surface 382 may be arranged above the antenna structure, e.g. in a direction away from the plane in which the waveguide 281 is provided, such that light emitted from the fluorescent dies impinges on the antenna structure 3 and is coupled into the waveguide. For example, light from a first die species having a first emission spectrum may be coupled into the waveguide in one direction of the waveguide, while light from a second die species having a second emission spectrum may be coupled into the waveguide in the other direction of the waveguide.

For example, the surface 381 may be a sample plate or a wall of a microfluidic channel, such that chemical or biological entities provided on the sample plate or introduced into the microfluidic channel, and which are labelled with at least one of the fluorescent dies, can be captured and immobilized onto the surface. Thus, the light coupled into the waveguide can be used to quantify the presence of the chemical or biological entities. Furthermore, by specifically labelling different biological or chemical entities with different dies, the light coupled into different directions of the waveguide can be used to indicate and/or quantify the presence of the different biological or chemical entities specifically.

In a second aspect, the present disclosure relates to a method for manufacturing an optical nanoantenna having a predetermined scattering directionality for light in the visible and/or the near infrared spectral range, e.g. an optical nanoantenna in accordance with embodiments of the first aspect of the present disclosure.

This method comprises providing a substrate, and providing an antenna structure composed of a dielectric material. This antenna structure is a simply-connected structure, having two distinct end portions, e.g. two open ends in the longitudinal direction of the structure. The antenna structure furthermore may have a longitudinal length in the range of 500 nm to 1.5 µm.

The antenna structure provided on the substrate may have a reflection symmetry with respect to a plane of symmetry oriented orthogonal to the plane of the substrate, such as to form two connected parts of the antenna structure, in which each part may be mirror symmetric with respect to the other part. These parts may be connected to each other at an acute angle. Each of the connected parts of the provided antenna structure may be a structure having a cross-sectional width in the range of 80 nm to 150 nm and a cross-sectional height in the range of 80 nm to 150 nm. Each of the connected parts may have a longitudinal length in the range of 300 nm to 650 nm.

In some embodiments, the providing of the antenna structure may comprise depositing an amorphous silicon film that has a thickness in the range of 80 nm to 150 nm on the substrate, e.g. on a semiconductor wafer, the thickness of this film corresponding to the cross-sectional height of the antenna structure. For example, this amorphous silicon film may be deposited using a plasma deposition technique, such as radio-frequency plasma enhanced chemical vapor deposition. However, other deposition techniques may also be suitable, such as molecular beam epitaxy, sputtering, spin coating or thermal/electron-beam evaporation.

In some embodiments, the providing of the antenna structure may comprise using electron-beam lithography followed by dry reactive ion etching, e.g. inductively coupled plasma etching. For example, providing the antenna structure may comprise the application of a negative photoresist, patterning the negative photoresist using electron-beam lithography, inductively coupled plasma etching of the patterned negative photoresist and removal of the remaining negative photoresist.

In some embodiments, the electron-beam lithography may be used to define the antenna structure as a V-shaped structure, a H-shaped structure in which two parallel bars of different length are interconnected by a crossbar, or a triangular shape. However, in other embodiments, another method of manufacture known in the art may alternatively be used to define the antenna structure.

For example, a V-shaped antenna structure may be formed, e.g. using electron-beam lithography, in which the two parts are connected at an angle to form the V-shape, and in which this angle is in the range of 60 degrees to 90 degrees.

For example, an amorphous silicon nanoantenna according to example embodiments of the first aspect of the present disclosure may be fabricated using a radio-frequency plasma enhanced chemical vapor deposition (RF-PECVD) tool, followed by electron beam lithography to fabricate, for example V-shaped, nanoantennas. A plurality of such nanoantennas may be produced in parallel, e.g. by lithographic production of periodic square arrays, for example having a pitch of 2 µm or 5 µm, or as dictated by the intended application. Negative resist may be used, e.g. ma-N2400.6 obtainable from micro resist technology GmbH. Inductively coupled plasma (ICP) etching may be employed to etch the nanoantennas, e.g. using a $SF_6/CF_4$ dry recipe. The etching time may be suitably selected such as to prevent over-etching of the substrate. Finally, the resist may be removed using a suitable resist remover, e.g. mr-Rem 400.

In a further aspect, the present disclosure also relates to the use of an optical nanoantenna in accordance with embodiments of the first aspect of the present disclosure for providing controllable light scattering directivity in photo-detection, fluorescence emission, sensing, color routing and/or spectroscopy applications.

In a yet further aspect, the present disclosure also relates to the use of an optical nanoantenna in accordance with embodiments of the first aspect of the present disclosure for providing controllable light scattering directivity in bio-medical sensing and/or near-field microscopy applications. For example, embodiments may also relate to a biosensor comprising an optical nanoantenna according to example embodiments.

In yet a further aspect, the present disclosure also relates to the use of an optical nanoantenna according to example embodiments of the first aspect of the present disclosure for polarization beam splitting. For example, design flexibility to effectively control the directional scattering depending on the excitation wavelengths and/or polarizations can be achieved according to example embodiments. For example, a polarization beam splitter can be provided that can route light with different polarizations (e.g. x- and y-polarized, or radially and azimuthally polarized light) into different directions. Such optical functionality can be obtained by (but not limited to) engineering other novel asymmetric shapes with optimized geometric parameters, e.g. as shown in FIG. 26 and FIG. 27, combining and arranging several asymmetric nanostructures in one single layer, or designing multilayer structures. In this way, nanophotonic devices can be designed with extraordinary performances. The present disclosure therefore also relates to a polarization beam splitter comprising an optical nanoantenna in accordance with embodiments of the first aspect of the present disclosure described hereinabove.

Examples are provided hereinbelow to assist the skilled person in understanding working principles and to reduce the present invention to practice. These examples are provided for informative purposes and are not to be construed as limiting in any way.

The directivity D referred to herebelow is defined as:

$$D = 10\log_{10}\frac{\int\int_{(\theta-\delta,\pi-\delta)}^{(\theta+\delta,\pi+\delta)}S(\varphi,\theta)\sin(\theta)d\varphi d\theta}{\int\int_{(\theta-\delta,-\delta)}^{(\theta+\delta,+\delta)}S(\varphi,\theta)\sin(\theta)d\varphi d\theta}$$

Here, $\theta$ and $\varphi$ are the polar and azimuthal angles in spherical coordinates as shown in FIG. 15. $S(\varphi, \theta)$ is the scattering intensity in simulated 2D projections or experimental back focal plane (BFP) images. In this manner, the ratio of the intensity integral between two diametrically opposite angular regions is calculated. For the results discussed hereinbelow, $\theta$ and $\delta$ are taken to be 135° and 10°, respectively. $\theta=135°$ considers the scattering into the forward diagonal directions, and $\delta=10°$ calculates the intensity integral in a 20°×20° angular region.

In the experimental BFP measurements discussed hereinbelow, an oil immersion objective with NA=1.40 was used. This collects scattering up to an angle of arc sin(1.40/1.52)=67°, where 1.52 is the refractive index of the glass substrates. In addition, in order to remove the intense transmitted light in the BFP image center for better imaging of the scattered light, a circular opaque disk was used, which corresponds to an angle of 20°. Therefore, an angular region between 20° and 67° is experimentally measured ($\theta=113°\sim160°$ as in the spherical coordinate definition). Accordingly, in FDTD simulations the scattering intensity between 20° and 67° is shown in 2D projection images.

The scattering directivity depends on the angular regions considered for its calculation. In FIG. 16, the directivity calculated using different diametrical angular regions is compared. Although the directivity magnitude is decreased with an increasing angular region of interest, the phenomenon of dual directional scattering into opposite directions remains. The example for the larger cross section nanoantenna (150×140 nm$^2$), discussed further hereinbelow, is shown. The directivity curves in different colors correspond to the panels surrounded with dotted lines of the equivalent colors. The directivity is calculated as the ratio of the intensity integral between the red and green angular regions. Here, $\Delta=2\delta$, and the angles 20°, 25°, 35°, 45°, 55° and 67° indicated in the panels correspond to 180°−$\theta$.

In a first example, an all-dielectric nanoantenna is presented, according to example embodiments. This nanoantenna allows directional side scattering of visible light, e.g. having a high left-to-right scattering ratio diagonal to the propagation direction. This example nanoantenna consists of a single V-shaped nanostructure, and was experimentally realized using amorphous silicon. By selecting a suitable geometry according to example embodiments, a wavelength dependent bidirectional scattering into diametrically opposite directions is achieved, as shown in FIG. 4. The scattering directions can be effectively controlled by the incident wavelength. Therefore, the all-dielectric nanoantenna can be considered as a wavelength router, which directs input optical signals according to the wavelength. Finite difference time domain (FDTD) simulations have shown that the 2-way directional color routing may be associated with the abundant localized electromagnetic modes that are unique to the all-dielectric nanostructures. In accordance with some devices, this cannot be achieved for similar plasmonic nanoantennas due to the weak magnetic modes associated therewith. The directional routing of visible light will be experimentally demonstrated further hereinbelow using a back focal plane (BFP) imaging setup. Furthermore, for illustrative purposes, the scattering and absorption properties of both silicon and gold V-shaped nanoantennas will be compared. From this analysis, it may be concluded that silicon can outperform gold as an efficient low-loss nanoantenna material.

The general concept of the all-dielectric wavelength router with bidirectional scattering is demonstrated in FIG. 4. A plane wave coming from a light source will be partially scattered and absorbed by the nanostructure. In our scheme, the incident light is polarized in the y direction, perpendicular to the plane of symmetry of the V-shaped nanoantenna (xz plane). In this configuration, the dipolar symmetry of the system is broken and asymmetric scattering perpendicular to the E-k plane (yz plane) can be expected. This indicates that optical scattering into the leftward and rightward directions will be different. By engineering the geometry of the Si nanoantenna, e.g. using simulations based on FDTD methods, scattering of different wavelengths of visible light into opposite diagonal directions can be obtained, as shown in the 3D scattering distributions and the corresponding 2D projections in FIG. 4. For the first wavelength $\lambda_1$, the light is scattered towards the left. At the other wavelength $\lambda_2$, the scattering is strongly directed towards the right. In this manner, an all-dielectric bidirectional wavelength router is achieved.

In FIG. 4, which conceptually illustrates an all-dielectric wavelength router according to example embodiments, it is shown that, using plane-wave illumination, the incident wavelength effectively determines the direction of the scattered light. At different wavelengths $\lambda_1, \lambda_2$, the incident light is scattered into the leftward and rightward directions, respectively. The 3D scattering patterns and the corresponding 2D projections shown in FIG. 4 were calculated using the FDTD method. The geometric parameters used in this example are L=400 nm, H=150 nm, W=140 nm and $\alpha$=75°. The two concerned wavelengths are $\lambda_1$=~755 nm and $\lambda_2$=~660 nm. A tilted view SEM image of the example V-shaped Si nanoantenna is also shown.

Lumerical FDTD Solutions solver v8.6 was used for the optical simulations. A total-field scattered-field (TFST) source was used to isolate the scattered field. To accurately evaluate the scattering of the nanoantenna on the glass substrate, a large monitor box was adopted and the Poynting vector on the box was calculated similar to previously reported by Vercruysse et al. in "Unidirectional side scattering of light by a single-element nanoantenna," Nano Lett. 13, pp. 3843-3849 (2013). The experimental refractive index data of the amorphous silicon was employed, and the glass substrate was modelled with the refractive index of 1.52.

The permittivity data of gold, for further simulations of a similar prior-art Au nanoantenna, was taken from Johnson and Christy handbook, see e.g. Phys. Rev. B 6, 4370 (1972).

More FDTD simulation results of this example all-dielectric wavelength router are shown in FIG. 5. The simulations were performed by taking into account the glass substrate (refractive index n=1.52), and special attention was paid to the far-field calculations in the inhomogeneous medium, e.g. calculations taking into account the semi-vacuum and semi-glass media properties into account, for example as described in Nano Lett., 13, 3843 (2013). In a simplified representation, the V-shaped nanoantenna could be considered as a bent waveguide that is truncated at the ends of both arms. The cross section of the nanoantenna, defined by the height H and width W, may strongly alter the supported modes and the localized electromagnetic field distributions, e.g. alter the modes with respect to a straight and untruncated waveguide. Therefore, scattering of the nanoantenna with a series of different cross sections was simulated for illustrative purposes. FIG. 5 demonstrates the dependence of the extinction and directivity spectrum on the cross section of the nanoantenna, for different cross sections, having cross-sectional areas H×W as indicated in FIG. 5, while keeping the arm length L=400 nm and the opening angle between the two arms $\alpha$=75° constant. The extinction spectra are offset for clarity's sake. It is shown that an evolution from unidirectional to bidirectional scattering can be obtained by increasing the nanoantenna cross section. For the quantitative calculation of the directivity, two diametrically opposite angular regions are selected, corresponding to scattering into the left and right diagonal directions of the glass substrate side. FIG. 5 further shows electric E and magnetic H field intensity distributions in a central plane of the nanoantenna. Furthermore, 3D scattering patterns, 2D projections and xz-plane cross-sections of the 3D patterns are shown, at corresponding wavelengths indicated by different colored triangles for the 80×90 nm$^2$ and 150×140 nm$^2$ cross section nanoantennas. The two angular regions are highlighted in the 2D projections and the xz-plane scattering cross-sections of FIG. 5. The directivity is calculated as the ratio of the scattering intensity integral between both angular regions.

For a Si nanoantenna with a relatively small cross section of 80×90 nm$^2$, only two extinction resonances are present at ~540 nm and ~830 nm. The electric and magnetic field intensity distributions at the two resonances are shown in FIG. 2c (gray and brown triangles). The 540 nm resonance supports a localized electromagnetic field inside the nanoantenna. At 830 nm, it is clearly observable that the magnetic field is mostly distributed in the surrounding medium. The electromagnetic near-field distribution dictates its far-field scattering patterns. Asymmetric near-field distribution near the E-k plane results in different light scattering into the leftward and rightward directions. Using the abovementioned directivity definition, the directivity of the 80×90 nm$^2$ nanoantenna is positive in the visible range and reaches a maximum of ~8 dB at ~590 nm, which is on the longer wavelength flank of the 540 nm extinction resonance. The electromagnetic near-field distributions in the xy-plane at this wavelength are also shown. The asymmetric distributions may result in the directional scattering. The incident light is predominantly scattered into the leftward diagonal direction into the glass substrate. For the resonance at 830 nm, no strong directional scattering is obtained.

As the cross section of the nanoantenna increases, more localized electromagnetic modes may be excited, especially in the shorter wavelength range. In the extinction spectra, the 540 nm resonance for the 80×90 nm$^2$ nanoantenna red shifts for increasing cross section, and remains the strongest resonance in the visible spectrum. Electric and magnetic field intensity distributions at this strongest resonance for the 150×140 nm$^2$ nanoantenna are shown (pink triangle, ~695 nm). They are similar to the corresponding field distributions of the 80×90 nm$^2$ nanoantenna except for the fact that more intense fields are concentrated inside the Si nanostructure due to the larger size. In addition, the spectra show resonances for the larger cross section nanoantennas, especially in the higher energy range. This may be due to the larger nanoantenna being able to support more localized electromagnetic modes.

In a simplified representation as a bent and truncated waveguide, it can also be observed that a straight waveguide with larger cross section can indeed support more localized modes. The supported localized modes of a Si strip waveguide on a glass substrate were simulated using Lumerical Mode Solutions. Experimental refractive index data of the amorphous Si were used. The dispersion curves and the modal field profiles are shown in FIG. 17. Dispersion curves of the Si strip waveguide on glass substrate having a cross section of 80×90 nm$^2$ are shown in dotted lines and open symbols, and of a 150×140 nm$^2$ cross section waveguide in solid lines and solid symbols. Only the first five guided modes for the 150×140 nm$^2$ cross section waveguide are shown. The first two modes correspond to TM and TE modes, respectively, for both cross section waveguides (in black and red boxes). The 150×140 nm$^2$ cross section waveguide support more modes than the 80×90 nm$^2$ one. These higher order modes of the 150×140 nm$^2$ cross section waveguide are mixtures of both TM and TE components.

The high-order modes of the nanoantenna according to example embodiments may consist of both TM and TE components and may be highly spectrally dependent.

In FIG. 18, the electromagnetic modes that the 150×140 nm$^2$ cross section waveguide and V-shaped nanoantenna support are compared. Dispersion curves for the 150×140 nm$^2$ cross section waveguide, having infinite length, are shown. The resonant energies corresponding to the V-shaped nanoantenna with the same cross sectional dimension are indicated by dotted horizontal lines and solid triangles in different colors. Extinction and directivity spectra for the 150×140 nm$^2$ cross section nanoantenna, and cross section distributions of electric and magnetic field intensity for the waveguide 1801 and V-shaped nanoantenna 1802 are also shown. In the dispersion curves of the waveguide, the corresponding resonant energies of the V-shaped nanoantenna are also indicated by dotted horizontal lines and solid triangles in different colors. The wavenumber k is calculated by $k=\pi l/L$, where l is the mode index (l=1, 2, 3, 4, . . . ) and L is the total length of the nanoantenna. For the V-shaped nanoantenna, the ~570 nm and ~695 nm (dark green and blue triangles) resonances show clear signature electromagnetic field distributions corresponding to the waveguide mode indicated by the same colored lines, respectively. The mode at ~830 nm (black triangle) is leaking with the strongest electromagnetic field concentrated at the intersection of the two arms. On the shorter and longer wavelength flanks of the strongest resonance at ~660 nm and ~755 nm (green and red triangles), the electromagnetic fields are tilted into opposite directions against the z-axis, giving rise to the unique dual directional scattering.

These high-order modes may result in abrupt changes of electromagnetic field distributions in the nanoantenna as a function of the excitation wavelength. As an example, the field distributions on the shorter and longer wavelength flanks of the strongest 695 nm resonance for the 150×140 nm² nanoantenna are displayed (green and red triangles at ~660 and 755 nm respectively, corresponding to the directivity dip and peak as will be shown further hereinbelow). The interference of the emerging localized modes results in the asymmetric field distributions at both the wavelengths. Especially, on the shorter wavelength flank of 660 nm, due to the appearance of the higher order modes, the electromagnetic field distribution becomes greatly different compared to that at 755 nm, implying different far-field scattering patterns.

Due to the appearance of the unique localized modes and their resulting inference, the directivity spectra start to exhibit interesting features. The directivity peak remains and also red shifts with the increasing cross section of the nanoantenna. Its magnitude becomes larger as well, indicating a greater degree of directional scattering into the left direction. Moreover, on the shorter wavelength flank of the strongest extinction resonance, a directivity dip appears and grows stronger as the nanoantenna cross section increases. For the 150×140 nm² nanoantenna, the absolute magnitudes of the directivity peak and dip become comparable (12 dB and ~10 dB). The bidirectional scattering strongly depends on the asymmetric distributions of localized electromagnetic fields as discussed above. As shown in the scattering patterns in FIG. 5, at the wavelength of ~755 nm (red triangle), the scattered light is mostly directed into the leftward diagonal direction. As the incident wavelength decreases, the directivity drops off and becomes negative. Accordingly, the scattered light is gradually shifted into the rightward directions. Within a narrow spectral window at the wavelength of ~660 nm, the light has largely shifted to the diametrically opposite direction, the rightward diagonal direction (green triangle). Therefore, a wavelength router with bidirectional scattering is realized.

It may be observed that the bidirectional side scattering of the Si nanoantenna according to example embodiments may rely on the abundance of the supported localized electromagnetic modes. For the 80×90 nm² nanoantenna, the lack of adequate high order modes may result in only unidirectional scattering into the leftward diagonal direction. For increasing cross sectional areas, e.g. the 150×140 nm² nanoantenna, may exhibit more emerging localized electromagnetic modes. Because such rich localized modes strongly depend on the excitation wavelength, this may offer the possibility of asymmetric near-field distributions and abrupt changes thereof within a narrow spectral range. This may give rise to the additional directional scattering to the opposite rightward direction and thus enable the wavelength routing. These features are unique to all-dielectric nanostructures according to example embodiments, and, as far as known in the art, cannot be realized using similar plasmonic designs. For example, a series of Au nanoantennas with similar V-shaped geometries have also been tested, which do not show the bidirectional scattering behavior, further discussed hereinbelow. Therefore, rational engineering all-dielectric nanostructures can open up more exciting opportunities for novel design of light-matter interactions.

An example of the scattering of a V-shaped Au nanoantenna as known in the art is shown in FIG. 19. Scattering cross sections and directivity of such nanoantenna are illustrated, as well as 3D scattering patterns and 2D projections at the wavelengths indicated by the corresponding colored dots. The geometry of the Au nanoantenna is taken the same as the Si counterpart, according to example embodiments, with the optimized bidirectional scattering. However, the Au nanoantenna exhibits predominantly positive directivity, indicating scattering into the leftward directions (red dot). Note that the magnitude of the directivity peak (10 dB) is weaker than the optimized design (18 dB). In addition, the directivity dip shows no asymmetric scattering into the angular regions of interest (green dot).

Example nanoantennas according to example embodiments were fabricated to demonstrate the bidirectional color routing. Manufacture may start by depositing amorphous Si on glass substrates using plasma enhanced chemical vapor deposition (PECVD). The obtained amorphous Si exhibits a large real part of the refractive index in the visible range (n>3.5), thus providing a candidate for all-dielectric nanoantenna studies. Amorphous Si films with a thickness of 150 nm were deposited, thus determining the height H of the nanoantennas. The amorphous silicon films were deposited using a radio-frequency plasma enhanced chemical vapor deposition (RF-PECVD) tool (AK1000 available from Roth & Rau). V-shaped antennas were patterned using electron beam lithography with the negative resist maN2400.6 (available from micro resist technology GmbH), followed by inductively coupled plasma (ICP) etching using an Oxford Plasmalab 100 system with a $SF_6/CF_4$ dry recipe. The antennas are arranged in square arrays with a pitch of either 2 μm for extinction spectroscopy or 5 μm for back focal plane (BFP) measurements. The resist was removed using a dedicated resist remover mr-Rem 400. SEM images of fabricated nanoantennas are shown in FIG. 6, and also in FIG. 4.

The extinction spectra described hereinbelow were taken using a Fourier transform infrared (FTIR) microscope (Bruker vertex 80 v and Hyperion) with two 15× magnification Cassegrain condensers. The BFP setup was excited using a Koheras supercontinuum laser source. The excitation wavelength in steps of every 5 nm was filtered using an Acousto-Optic Tunable Filter (AOTF) system, and, after passing a polarizer, was weakly focused on the sample nanoantenna array by a 20× objective (NA=0.25). The scattered light was collected using a 63× oil immersion objective (NA=1.40), and the BFP containing the angular scattering information was projected to a silicon CMOS camera using a series of lenses. The obtained BFP images were processed using the same procedure as in a previous report by Vercruysse et al., referred to hereinabove.

In FIG. 6, experimental results are presented of the nanoantennas with cross section of 150×140 nm². The other geometric parameters, an arm length L of 400 nm and an opening angle α of 75°, were selected according to the FDTD simulation results discussed hereinabove. FIG. 6 shows the extinction and directivity spectra for the 150×140 nm² cross section nanoantenna by solid lines. Corresponding FDTD simulation results are shown as dashed lines. Experimental extinction spectra were obtained with a Fourier transform infrared (FTIR) microscope using two 15× magnification Cassegrain condensers. The angular scattering distributions into the glass substrate side are measured using a back focal plane (BFP) imaging setup. A 63× oil immersion objective with a NA of 1.40 is taken to collect scattered light up to an angle of 67°. The scale bar in the SEM image corresponds to 200 nm.

As shown in FIG. 6, for this 150×140 nm² nanoantenna, the strongest extinction resonance appears at ~695 nm. On the longer and shorter wavelength flanks of this resonance, bidirectional scattering into opposite directions can be observed. The corresponding BFP images are displayed as well, which clearly show the bidirectional scattering into the leftward and rightward directions. The directivity peak and dip show up at ~745 nm and 665 nm, respectively. Within a narrow spectral range of 80 nm, the scattered light is routed into diametrically opposite directions. Experimental values for the directivity of 10 dB and −8 dB were obtained. These experimental results are in good agreement with the FDTD calculations. For further verification, the directivity spectrum of symmetric Si nanorods)($\alpha$=180° were measured, which show a directivity close to 0 dB. The directivity of such straight Si nanorod is illustrated in FIG. 20, as well as a SEM image and a BFP image at 650 nm of the nanorod. The dimensions of the nanorod shown were 150 nm×130 nm×450 nm (Height×Width×Length). The scale bar in the SEM image is 200 nm.

Furthermore, the extinction and directivity spectra of the 80×90 $nm^2$ cross section nanoantennas in accordance with embodiments were measured, see FIG. 21, which show scattering in agreement with the FDTD simulation results. FIG. 21 shows the extinction and directivity spectra for the 80×90 $nm^2$ cross section nanoantenna, in solid lines. Corresponding FDTD simulation results are shown as dashed lines. The arm length L of the nanoantenna is ~400 nm, and the opening angle $\alpha$ between the arms is 75°. Furthermore, FIG. 21 shows a SEM image and a BFP image at the corresponding wavelength indicated by the black dot. The scale bar in the SEM image is 200 nm. As shown, the 80×90 $nm^2$ nanoantenna exhibits two extinction resonances at ~560 nm and 860 nm, respectively. Its directivity is positive in the visible range, indicating directional scattering into the leftward diagonal direction. The directivity peak (~620 nm) is positioned on the longer wavelength flank of the ~560 nm resonance. These results agree well with the FDTD calculations.

Figures 22A, 22B:
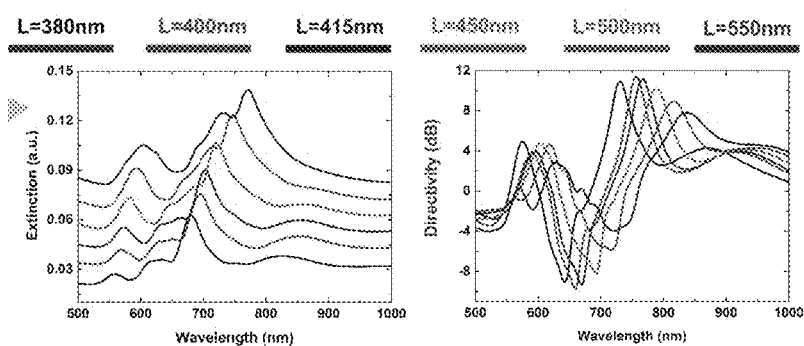
FIG. 22A illustrates FDTD calculations of the dependence of the extinction on nanoantenna geometry, according to example embodiments.
FIG. 22B illustrates FDTD calculations of the dependence of the directivity on nanoantenna geometry, according to example embodiments.
Figures 22C, 22D:
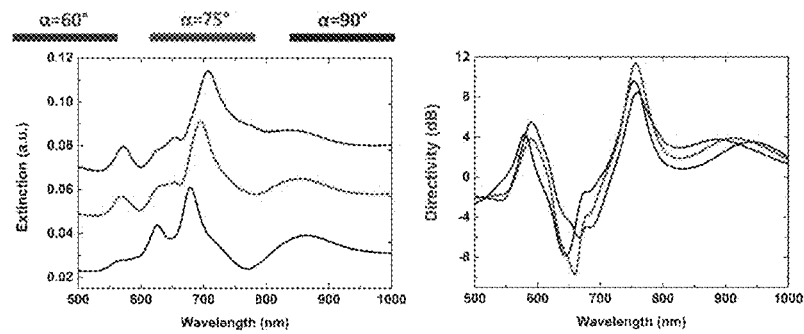
FIG. 22C illustrates FDTD calculations of the dependence of the extinction on nanoantenna geometry, according to example embodiments.
FIG. 22D illustrates FDTD calculations on the dependence of the directivity on nanoantenna geometry, according to example embodiments.

For the example all-dielectric bidirectional wavelength router, namely the 150×140 $nm^2$ nanoantenna, the dependence of the scattering directivity on the arm length L, in graph 71, and opening angle $\alpha$, in graph 72, is further demonstrated. The results are shown in FIG. 7. The height of the nanoantennas was H=150 nm, and the width was similar, W=~140 nm. The opening angle $\alpha$=75° in graph 71 was kept constant. The arm length L=~400 nm in graph 72 was kept constant. Corresponding SEM images indicated by different colored boxes are also shown. Scale bar is 200 nm. Upon increasing of the arm length L (while keeping $\alpha$ at 75°), the directivity peak and dip red shifts. Maximum directivity peak and dip values are obtained for the arm length of ~400 nm (red curve), e.g. the antenna discussed hereinabove in FIG. 6. With longer arm lengths, the bidirectional scattering behavior remains and can be tuned in the visible and near-infrared range, despite a decrease in the magnitude of the directivity peak and dip. In addition, for a longer arm length, more spectral features of directivity dips appear due to the excitation of more high-energy modes in the nanoantennas. With the same arm length of ~400 nm while increasing the opening angle, the directivity peak does not exhibit considerable shifts, while the directivity dip red shifts accordingly. Further increasing the opening angle results in a magnitude decrease of the directivity peak and dip. The corresponding extinction dependence on the arm length, graph 81, and the opening angle, graph 82, is shown in FIG. 8. The spectra are offset for clarity's sake. The strongest extinction resonance red shifts with both increasing arm length L and opening angle $\alpha$, and more resonance modes are clearly revealed in the shorter wavelength range. Further FDTD calculations of the directivity dependence on nanoantenna geometry are shown in FIG. 22. FIG. 22 shows the extinction and directivity dependence on the arm length and the opening angle. The height and width of the nanoantennas was kept constant (H=150 nm, W=140 nm). The opening angle for the varying arm length antennas was 75°. The arm length for the varying opening angle antennas was 400 nm. Extinction spectra were offset for clarity.

Plasmonic nanostructures have been extensively exploited as directional antennas. For evaluation of the all-dielectric nanoantenna in accordance of embodiments, the example Si nanoantenna is compared to an alternate Au nanoantenna of similar shape. Due to a different material composition, selecting a suitable dimension of the alternate nanoantennas may be difficult for providing an unbiased comparison. In this example, a V-shaped Au nanoantenna with optimized performance of scattering directivity, previously disclosed in the art, was selected, see Vercruysse et al., "Unidirectional side scattering of light by a single-element nanoantenna," in Nano Lett. 13, pp. 3843-3849 (2013). Specifically, the dimensions of the selected Au nanoantenna are H=50 nm, W=50 nm, $\alpha$=120°, and L=250 nm. This Au nanoantenna is compared to the 80×90 $nm^2$ and 150×140 $nm^2$ Si nanoantennas discussed hereinabove. The arm length of the Au nanoantenna was adjusted to show similar spectral resonance positions as the 150×140 $nm^2$ Si nanoantenna. The FDTD calculation results are summarized in FIG. 9 to FIG. 12. The dimensions in the legends shown in these figures are H (height)×W (width)×L (arm length). For the Si nanoantenna, the opening angle was 75°, while it was 120° for the Au nanoantenna.

The scattering directivity, calculated using the same method as the left-to-right ratio described hereinabove, is shown in FIG. 9. The Au nanoantenna (blue curve) exhibits unidirectional scattering, predominantly into the leftward direction. The directivity peak can reach a maximum value of 18 dB. In comparison, the Si nanoantenna enables novel directional scattering with more exciting possibilities for optical manipulations. For the smaller cross section of 80×90 $nm^2$ (black curve), unidirectional scattering into the same leftward direction is obtained despite its smaller directivity peak (8 dB). The larger 150×140 $nm^2$ Si nanoantenna demonstrates novel bidirectional scattering into both leftward and rightward directions, allowing the wavelength routing behavior. In addition, to compare the absolute scattering intensity, the xz-plane scattering cross section profiles at the corresponding spectral positions as indicated by the dots in FIG. 10 are presented in FIG. 11. Note that the blue curve for the Au nanoantenna has been enlarged by one order of magnitude for clarity. Both Si nanoantennas demonstrate stronger scattering intensity compared to the Au nanoantenna. Particularly, the 150×140 $nm^2$ Si nanoantenna exhibits more than one order of magnitude stronger scattering than the Au nanoantenna. This implies that Si, having a high refractive index, can scatter light more efficiently than Au. This is also in part because of the larger size of the Si nanoantennas. To rule out the size difference, aiming for a unbiased comparison, the scattering intensity, or scattering cross section, was normalized by the volume of the nanoantenna, and the results are shown in FIG. 11. At the resonance of ~695 nm, the normalized scattering intensity of the 150×140 $nm^2$ Si nanoantenna is still about twice as large as that of the Au nanoantenna. While the absolute scattering intensity of the 150×140 $nm^2$ Si nanoantenna at this resonance is ~28 times larger than the Au. The absolute scattering intensity spectra are shown in FIG. 13. Additionally, an all-dielectric nanoantenna in accordance with example embodiments may have low absorption losses. The imaginary part of the refractive index of the amorphous Si approaches to zero beyond ~700 nm, see FIG. 14, which shows the refractive index of the amorphous silicon deposited by the PECVD method measured by ellipsometry. The refractive index was measured on a Sopralab GES5E variable angle spectroscopic ellipsometer. This low imaginary part of the refractive index implies low absorption losses. FIG. 12 shows that in this spectral range the Si nanoantenna demonstrates much lower normalized absorption cross sections. Nevertheless, the Au nanoantenna shows a strong plasmonic absorption resonance at ~710 nm.

In order to further elucidate the bidirectional scattering properties of a V-shaped Si nanoantenna according to example embodiments, a simulated scattering cross section was decomposed into electric and magnetic multipole modes based on the approach proposed by Grahn et al, see e.g. New Journal of Physics, 14, 093033 (2012). Each multipole mode exhibits distinctive scattering patterns. By thoroughly analyzing their relative intensity and phase, the underlying physics of the extraordinary bidirectional scattering is unveiled. The results of the same Si nanoantenna as discussed hereinabove are exhibited in FIG. 23. The analysis is conducted in vacuum, i.e. without the glass substrate. Because the electromagnetic fields are mostly localized inside the nanoantenna, this simplification only induces minor spectral shifts. As shown in FIG. 23A, the electric (ED, black curve) and magnetic dipole (MD, blue curve) modes dominate the scattering cross section of the nanoantenna. They present multiple resonances that strongly overlap in the spectral range where the bidirectionality occurs. The quadrupole EQ (red curve) and MQ (green curve) modes also contribute to the scattering in the same spectral window, while the electric and magnetic octupole modes are negligible and thus not shown. The sum of all the dipole and quadrupole mode contributions is calculated in FIG. 23B (dark yellow curve) and compared to the scattering cross section directly obtained by FDTD simulations (pink curve). The multipole analysis nicely reproduces all the spectral features of the FDTD calculations. The differences in the high frequency range result from the limited angular mesh sizes that are used in the multipole analysis calculation.

From this decomposition analysis in FIG. 23A, it may be concluded that the very strong scattering resonance observed in panel b at ~690 nm (blue dot) is a MD mode. In FIG. 23C, the magnetic field profile in the xy-plane is plotted for this resonance. The color map indicates the total magnetic (or electric) field intensity, and the white arrows show the field directions. The magnetic field points from the intersection of the nanoantenna arms to the tips, revealing a net MD polarized in the x-axis ($MD_x$). In the vertical cross section that is perpendicular to the nanoantenna arm, the circulating electric field corroborates the existence of a MD oriented along the nanoantenna arms. Moreover, in the spectral range that the bidirectional scattering appears, the electric or magnetic field profiles at the other two ED and MD resonances are also displayed in FIG. 23C. At ~715 nm (black dot), a resonance of y-polarized electric dipole $ED_y$ arises, with the dominant electric field pointing from the upper tip to the lower tip through the intersection. At ~745 nm (red dot), the MD mode can be further decomposed into $MD_x$ and $MD_z$ modes, polarized in the x- and z-axis, respectively.

Analysis of the interferences between the electric and magnetic multipoles is able to offer a deeper understanding of how the bidirectional scattering occurs. Nevertheless, a handful of multipole modes exist. Besides the dipole modes ($ED_y/MD_x/MD_z$) discussed above, the electric quadrupole (EQ) mode can also be decomposed into a xy-plane component ($EQ_{xy}$) and a yz-plane component ($EQ_{yz}$). Each multipole component exhibits distinctive scattering patterns. They also show largely different intensity and phase spectra. In addition, besides the left-to-right scattering, forward-to-backward scattering with strong spectral dependence coexists. The forward-to-backward scattering is intrinsic to the Si nanostructures and also present without the glass substrate. Therefore, in order to clearly reveal the underlying physics of the left-to-right bidirectional scattering, we analyze only the multipole modes that greatly contribute to the scattering into the x-axis, in which direction the bidirectional scattering occurs, instead of giving a fully detailed derivation by considering all the multipole modes. A separate explanation for the forward-to-backward scattering by analyzing the multipole modes of interest is provided in Supplementary information.

FIG. 24 demonstrates the multipole analysis of the left-to-right bidirectional scattering. In FIG. 24A, the directivity spectrum of the Si nanoantenna in vacuum obtained by FDTD simulations is plotted as the pink dashed line. The directivity peak and dip appear at ~755 nm and ~655 nm on the longer and shorter wavelength flanks of the strong MD resonance at 690 nm, respectively (red and green dots). The modes that contribute to the scattering in the x-axis are carefully selected based on the individual scattering patterns of each multipole. They include the y-polarized electric dipole $ED_y$, the z-polarized magnetic dipole $MD_z$ and the electric quadrupole $EQ_{xy}$ in the xy-plane. The individual 3D scattering patterns are illustrated in FIG. 24A (2D cross section in the xy-plane are also shown in FIG. 24C). The final scattering patterns strongly depend on the relative intensity and phase of the selected modes. This type of information can be extracted from the multipole coefficient a of each mode, which is complex number in this case. In FIG. 24B, we plot the complex coefficients a of the three selected modes in a vector diagram at the wavelengths corresponding to the directivity peak and dip. At the directivity peak of 755 nm, the $ED_y$ and $MD_z/EQ_{xy}$ modes are resonant mostly in phase (red dot, FIG. 24B). As a result, the in-phase interference in the asymmetrically shaped nanoantenna generates the leftward directional scattering (red dot, FIG. 24C). The final scattering patterns in FIG. 24C are calculated based on the sum of only the three selected modes, $ED_y$, $MD_z$ and $EQ_{xy}$. In comparison, at the directivity dip of 655 nm, the phase of the $ED_y$ mode remains mostly unchanged, while the $MD_z$ and $EQ_{xy}$ modes experience an phase change of ~π (green dot, FIG. 24B), resulting in the out-of-phase interference. Consequently, the directionality shifts to the opposite right direction as demonstrated in FIG. 24C (green dot). This is the underlying reason that the all-dielectric nanoantenna demonstrates the extraordinary bidirectional scattering over a narrow visible range. The ~π phase shift of the $MD_z/EQ_{xy}$ modes plays a significant role here.

Moreover, a complete left-to-right directivity spectra based on the sum of the selected $ED_y$, $MD_z$ and $EQ_{xy}$ modes are exhibited as the solid lines in FIG. 24A. The directivity is calculated as the intensity ratio of two angular regions centered in the x-axis. The spectrum obtained by the sum of all the three modes nicely reproduces the spectral features of the FDTD results. Comparisons with the other two combinations of selected modes reveal that the directivity peak is mainly derived from the interference between the $ED_y$ and $MD_z$ modes (blue curve in FIG. 24A), while the dip is dominated by the $ED_y$ and $EQ_{xy}$ interference (red curve in FIG. 24A).

In the literature, it has been reported that a silicon nanosphere presents bidirectional scattering in the forward and backward directions, which can also be explained by the in- and out-of-phase interferences of the in-plane ED and MD modes. In the spectral range between the ED and MD resonances, a phase difference of π arises. Therefore, the out-of-phase interference causes the scattering to the opposite backward direction. In the case of our V-shaped nanoantenna, the asymmetric geometry breaks the symmetry against the E-k plane (yz-plane), resulting in the left-to-right bidirectional scattering in the x-axis. The ~π phase shift of the $MD_z/EQ_{xy}$ modes is a complex result from all the electromagnetic multipoles and their interferences. Especially, the phase of the $MD_z/EQ_{xy}$ modes changes abruptly in the spectral range where the bidirectional scattering occurs and covers a full range of 2π. The strongest and sharp MD resonance at 690 nm is essential in this aspect. To further consolidate the importance of the strong MD resonance, we have also studied the dependence of the scattering directionality on the geometric cross section (Height H×Width W) of the nanoantenna (Supplementary Information Part 4). In the Si nanoantenna with a smaller cross section, e.g. 80×90 nm$^2$, which exhibits much weaker MD resonance, no abrupt phase change and bidirectional scattering are observed.

As demonstrated hereinabove, unlike plasmonic structures, all-dielectric nanoantennas are capable of supporting a host of localized electromagnetic modes, which lead to remarkable directional scattering properties. This may enable novel possibilities for manipulation of light-matter interactions and flexible design of novel optical devices. For example, the all-dielectric wavelength router in accordance with embodiments that was demonstrated hereinabove may be applied in spectroscopic sensing. Spectral analysis by conventional sensors is mostly achieved using gratings or filters, which are large compared to the nanoantenna size and difficult to miniaturize. The procedure can be furthermore be simplified, e.g. when the spectral information is already systematically contained in the angular scattering patterns. This can therefore result in more compact and cheaper nanophotonic devices. The possible tunability in the visible range may be used in further optimized designs. Surface enhanced spectroscopies, enabled by the electromagnetic hot spots of all-dielectric nanoantennas, can also use this aspect for further efficiency enhancement. In addition, selectively receiving or transmitting photons from or in certain directions in a controllable manner may be exploited to increase the signal-to-noise ratio of a photodetector.

A nanoantenna in accordance with embodiments, e.g. having a large cross section of 150×140 nm$^2$, may support abundant localized electromagnetic modes, particularly in the high energy visible spectral range. The interference of these modes may result in the asymmetric yet fast changing electromagnetic field distributions within a narrow spectral range of less than 100 nm. This may give rise to bidirectional scattering into diametrically opposite directions as supported by both the FDTD simulations and experimental measurements presented hereinabove. It is also demonstrated hereinabove that all-dielectric nanoantennas based on silicon can exhibit stronger scattering intensity with low absorption losses compared to a prior-art Au nanoantenna. With the abundance of the supported localized electromagnetic modes, all-dielectric nanostructures may offer pathways for design of nanophotonic devices and high-performance metamaterials.

In a further example, FIG. 32 and FIG. 33 illustrate a simulation of an integrated waveguide structure according to example embodiments, in which a triangularly shaped antenna structure couples light into respectively a positive direction along the longitudinal axis of the waveguide and a negative direction along the longitudinal axis of a SiN waveguide, such as shown in FIG. 30 and FIG. 31. In this example, the waveguide has a width of 500 nm and a height of 180 nm. The triangularly shaped antenna structure is made of amorphous silicon and has a width of 400 nm in the direction corresponding to the width of the waveguide. The triangularly shaped antenna structure, in this example, has a height of 150 nm, in the direction corresponding to the height of the waveguide. Due to the asymmetry of the antenna structure with respect to a perpendicular cross-section of the waveguide through the geometrical center of the antenna structure, the coupling of light into the positive and the negative direction of the waveguide is wavelength dependent.

FIG. 32 shows the transmission of light as a function of wavelength, as a percentage of the incident light radiation intensity for that wavelength, into respectively the positive and the negative direction of light coupling into the waveguide. For example, the transmission into the positive direction, e.g. in the direction of the base of the triangular shape, may be stronger and can reach a transmission efficiency of about 5%. The transmission into the negative direction, e.g. in the direction of the apex of the triangular shape, may be weaker and may approach zero at excitation wavelengths of about 560 nm to about 705 nm.

FIG. 33 shows the directivity in dB of the light coupled into the waveguide, where this directivity is defined as 10·log($T_+/T_-$), where $T_+$ and $T_-$ refer to, respectively, the transmission into the positive waveguide direction and the negative waveguide direction. The horizontal dashed line illustrates the 0 dB directivity reference. It can been seen that the example integrated waveguide structure enables a wavelength-dependent bidirectional light coupling into the waveguide. The directivity spectrum shows two negative dips. Particularly, at about 705 nm, a negative directivity of about −20 dB can be obtained. By manipulating the triangle direction, light can thus be efficiently coupled into the engineered direction of the waveguide.

In a further example, FIG. 36 and FIG. 37 illustrate a simulation of an integrated waveguide structure according to example embodiments, in which a H-shaped antenna structure couples light into respectively a positive direction along the longitudinal axis of the waveguide and a negative direction along the longitudinal axis of a SiN waveguide, such as shown in FIG. 34 and FIG. 35. In this example, the waveguide has a width of 500 nm and a height of 180 nm. The H-shaped antenna structure is made of amorphous silicon and comprises two parallel bars, having different lengths, e.g. in this example respectively 400 nm and 250 nm, connected at their respective center to each other by a bar that is perpendicular to the aforementioned two parallel bars and having a length d. The H-shaped antenna structure, in this example, has a height of 150 nm, in the direction corresponding to the height of the waveguide. Due to the asymmetry of the H-shaped antenna structure with respect to a perpendicular cross-section of the waveguide through the geometrical center of the antenna structure, e.g. the asymmetric leg lengths, the coupling of light into the positive and the negative direction of the waveguide is wavelength dependent, e.g. directional coupling of an excitation light planar wave (E,k) into the waveguide can be achieved. At different excitation wavelengths, the antenna can route different wavelengths, e.g. colors, into opposite directions into the waveguide.

FIG. 36 displays the transmission spectrum into positive and negative waveguide directions for the H-shaped antenna with a distance d of 750 nm between the two antenna legs. A transmission of about 4% of excitation light can be efficiently coupled into the waveguide, which may be about one order of magnitude larger than similar plasmonic antennas. At different excitation wavelengths, the transmission into the positive and negative directions is also significantly different. To quantitatively calculate the directionality, the directivity is defined in decibel unit as ten times the base-10 logarithm of the transmission ratio into the positive and negative waveguide directions. The directivity spectra for three H-shaped antenna geometries, having different inter-leg distances d, are demonstrated in FIG. 37. The spectra clearly show bidirectional coupling into the waveguide. For a leg distance of 750 nm, a positive directivity of about 20 dB and a negative directivity of about −12 dB can be obtained. The directivity spectrum can be tuned by engineering the antenna geometry, e.g. the leg distance d as illustrated by FIG. 37. The asymmetric antenna structure, such as the H-shaped example or other embodiments, can thus offer an effective and/or efficient method to couple and direct visible and near-infrared light into a dielectric waveguide.

What is claimed is:

1. An optical nanoantenna, for directionally scattering light in a visible or a near-infrared spectral range, comprising:
    a substrate; and
    an antenna structure disposed on the substrate,
    wherein the antenna structure comprises a dielectric material having a refractive index that is higher than a refractive index of the substrate and a refractive index of a surrounding medium,
    wherein the antenna structure comprises a structure having two distinct end portions,
    wherein the antenna structure is asymmetric with respect to at least one mirror reflection in a plane that is orthogonal to a plane of the substrate,
    wherein the antenna structure has a reflection symmetry with respect to a plane of symmetry so as to form two connected parts of the antenna structure,
    wherein the two connected parts are mirror symmetric with one another,
    wherein the plane of symmetry is orthogonal to the plane of the substrate, and
    wherein the two connected parts are connected to each other at an acute angle.

2. The optical nanoantenna according to claim 1,
    wherein the optical nanoantenna exhibits a wavelength-controlled scattering directivity,
    wherein the antenna structure is adapted for scattering light in a visible or a near-infrared spectral range into two diagonally opposed directions, and
    wherein each of the two diagonally opposed directions are dependent on a wavelength of the light.

3. The optical nanoantenna according to claim 1, wherein each of the two connected parts has a cross-sectional width in a range of 80 nm to 150 nm and a cross-sectional height in a range of 80 nm to 150 nm.

4. The optical nanoantenna according to claim 1, wherein each of the two connected parts has a longitudinal length in a range of 300 nm to 650 nm.

5. The optical nanoantenna according to claim 1,
    wherein the acute angle is in a range of 60 degrees to 90 degrees.

6. The optical nanoantenna according to claim 1, wherein the two connected parts have a rectangular cross-sectional shape.

7. The optical nanoantenna according to claim 1, wherein the antenna structure comprises amorphous silicon, germanium, gallium arsenide, diamond, or silicon carbide.

8. The optical nanoantenna according to claim 1, wherein the optical nanoantenna provides controllable light scattering directivity for photodetection, fluorescence emission, sensing, color routing, or spectroscopy.

9. The optical nanoantenna according to claim 1, wherein the optical nanoantenna provides controllable light scattering directivity for biomedical sensing or near-field microscopy.

10. An optical nanoantenna, for directionally scattering light in a visible or a near-infrared spectral range, comprising:
    a substrate; and
    an antenna structure disposed on the substrate,
    wherein the antenna structure comprises a dielectric material having a refractive index that is higher than a refractive index of the substrate and a refractive index of a surrounding medium,
    wherein the antenna structure comprises a structure having two distinct end portions,
    wherein the antenna structure is asymmetric with respect to at least one mirror reflection in a plane that is orthogonal to a plane of the substrate, and
    wherein the antenna structure has a triangular shape or an H-shape.

11. The optical nanoantenna according to claim 10, wherein the antenna structure comprises amorphous silicon, germanium, gallium arsenide, diamond, or silicon carbide.

12. The optical nanoantenna according to claim 10, wherein the optical nanoantenna provides controllable light scattering directivity for photodetection, fluorescence emission, sensing, color routing, or spectroscopy.

13. The optical nanoantenna according to claim 10, wherein the optical nanoantenna provides controllable light scattering directivity for biomedical sensing or near-field microscopy.

14. An integrated waveguide structure, comprising:
    a waveguide; and
    an optical nanoantenna, for directionally scattering light in a visible or a near-infrared spectral range, comprising:
        an antenna structure disposed on a substrate,
        wherein the antenna structure comprises a dielectric material having a refractive index that is higher than a refractive index of the substrate and a refractive index of a surrounding medium,
        wherein the antenna structure comprises a structure having two distinct end portions,
        wherein the antenna structure is asymmetric with respect to at least one mirror reflection in a plane that is orthogonal to a plane of the substrate,
        wherein the antenna structure has a reflection symmetry with respect to a plane of symmetry so as to form two connected parts of the antenna structure,
        wherein the two connected parts are mirror symmetric with one another,
        wherein the plane of symmetry is orthogonal to the plane of the substrate, and
        wherein the two connected parts are connected to each other at an acute angle.

15. The integrated waveguide structure according to claim 14, wherein the antenna structure comprises amorphous silicon, germanium, gallium arsenide, diamond, or silicon carbide.

16. The integrated waveguide structure according to claim 14, wherein the directionally scattered light provides for photodetection, fluorescence emission, sensing, color routing, or spectroscopy.

17. The integrated waveguide structure according to claim 14, wherein the directionally scattered light provides for biomedical sensing or near-field microscopy.

18. The integrated waveguide structure according to claim 14, wherein each of the two connected parts has a cross-sectional width in a range of 80 nm to 150 nm and a cross-sectional height in a range of 80 nm to 150 nm.

19. The integrated waveguide structure according to claim 14,
   wherein the optical nanoantenna exhibits a wavelength-controlled scattering directivity,
   wherein the antenna structure is adapted for scattering light in a visible or a near-infrared spectral range into two diagonally opposed directions, and
   wherein each of the two diagonally opposed directions are dependent on a wavelength of the light.

20. The integrated waveguide structure according to claim 14, wherein each of the two connected parts has a longitudinal length in a range of 300 nm to 650 nm.

\* \* \* \* \*